(12) United States Patent
Manica et al.

(10) Patent No.: US 12,355,572 B2
(45) Date of Patent: Jul. 8, 2025

(54) SECURE COMMUNICATION PROTOCOL

(71) Applicant: Rockwell Collins, Inc., Cedar Rapids, IA (US)

(72) Inventors: Luca Manica, Trento (IT); Goran Djuknic, New York, NY (US); Marco Carloni, Rome (IT)

(73) Assignee: Rockwell Collins, Inc., Cedar Rapids, IA (US)

( * ) Notice: Subject to any disclaimer, the term of this patent is extended or adjusted under 35 U.S.C. 154(b) by 441 days.

(21) Appl. No.: 17/859,554

(22) Filed: Jul. 7, 2022

(65) Prior Publication Data

US 2023/0010517 A1  Jan. 12, 2023

(30) Foreign Application Priority Data

Jul. 9, 2021  (EP) .................................... 21425033

(51) Int. Cl.
*H04L 1/1812* (2023.01)
*H04B 7/185* (2006.01)
(Continued)

(52) U.S. Cl.
CPC ....... *H04L 1/1812* (2013.01); *H04B 7/18506* (2013.01); *H04L 1/0061* (2013.01); *H04L 1/1864* (2013.01)

(58) Field of Classification Search
CPC ... H04L 1/1812; H04L 1/0061; H04L 1/1864; H04B 7/18506; H04K 1/02; H04K 1/10
See application file for complete search history.

(56) References Cited

U.S. PATENT DOCUMENTS 9,686,038 B2 * 6/2017 Shapira ................. H04W 12/03
10,069,592 B1 * 9/2018 Krunz ...................... H04K 3/43
(Continued)

FOREIGN PATENT DOCUMENTS

CN  108738133 B  4/2019
CN  111885546 A  11/2020
(Continued)

OTHER PUBLICATIONS

Joint PHY/MAC Layer AN-Assisted Security Scheme in SVD-Based MIMO HARQ system, Huiyun Xia, Shuai Han, Cheng Li, Weixiao Meng, 2019 IEEE/CIC International Conference on Communications in China (ICCC), IEEE, Aug. 11, 2019 (Year: 2019).*

(Continued)

*Primary Examiner* — Edan Orgad
*Assistant Examiner* — Malick A Sohrab
(74) *Attorney, Agent, or Firm* — Suiter Swantz IP

(57) ABSTRACT

A method of transmitting a message from a sender to a receiver is provided, wherein the communication between the sender and receiver is performed using a hybrid automatic-repeat-request protocol. Artificial noise is added digitally to a first data packet in order to trigger transmission of a second data packet. Corresponding artificial noise is added digitally to the second data packet such that the receiver device can process the data packets together to remove the introduced artificial noise and extract the desired message. Also disclosed are methods where artificial noise is added to a predetermined set of plural data packets in a similar fashion.

20 Claims, 13 Drawing Sheets

(51) Int. Cl.
*H04L 1/00* (2006.01)
*H04L 1/1829* (2023.01)

(56) References Cited

U.S. PATENT DOCUMENTS

| | | | | |
|---|---|---|---|---|
| 2007/0093986 | A1* | 4/2007 | Armstead | H04L 43/16 |
| | | | | 702/182 |
| 2009/0070877 | A1* | 3/2009 | Davids | H04L 63/1408 |
| | | | | 726/23 |
| 2013/0343273 | A1* | 12/2013 | Barbieri | H04L 1/1822 |
| | | | | 370/328 |
| 2021/0203433 | A1* | 7/2021 | Arslan | H04L 9/3231 |
| 2022/0046114 | A1* | 2/2022 | Entelis | H04L 69/04 |

FOREIGN PATENT DOCUMENTS

| | | | | |
|---|---|---|---|---|
| CN | 110266704 B | 5/2021 | | |
| EP | 3732826 A2 | 11/2020 | | |
| WO | WO-2019154447 A1 * | 8/2019 | | H04L 27/2003 |
| WO | WO-2019209225 A2 * | 10/2019 | | H04W 12/03 |
| WO | 2020148746 A1 | 7/2020 | | |

OTHER PUBLICATIONS

Joint PHY /MAC Layer Security Design Using ARQ With MRC and Null-Space Independent PAPR-Aware Artificial Noise in SISO Systems, Jehad M. Hamamreh and Huseyin Arslan, IEEE Transactions on Wireless Communications, vol. 17. No. 9, Sep. 2018 (Year: 2018).*

European Patent Office, European Office Action received in EP Application No. 21425033.4, Jun. 25, 2024, 7 pages.

Tomasin, "Secure HARQ with Multiple Encoding Over Block Fading Channels: Channel Set Characterization and Outage Analysis," IEEE Transactions on Information Forensics and Security, vol. 9, No. 10, Oct. 1, 2014, 12 pages.

Extended Search Report in European Application No. 21425033.4 dated Jan. 1, 2022, 11 pages.

Hamamreh Jehad M et al: "Classifications and Applications of Physical Layer Security Techniques for Confidentiality: A Comprehensive Survey", IEEE Communications Surveys & Tutorials, vol. 21, No. 2, Oct. 3, 2019 (Oct. 3, 2019), pp. 1773-1828, XP011727908, DOI: 10.1109/COMST.2018.2878035 [retrieved on May 31, 2019].

J. M. Hamamreh et al., "Joint PHY/MAC Layer Security Design Using ARQ With MRC and Null-Space Independent PAPR-Aware Artificial Noise in SISO Systems," in IEEE Transactions on Wireless Communications, vol. 17, No. 9, pp. 6190-6204, Sep. 2018, doi: 10.1109/TWC.2018.2855163.

Xia Huiyun et al: "Joint PHY/MAC Layer AN-Assisted Security Scheme in SVD-Based MIMO HARQ system", 2019 IEEE/CIC International Conference on Communications in China (ICCC), IEEE, Aug. 11, 2019 (Aug. 11, 2019), pp. 328-333, XP033623146, DOI: 10.1109/ICCCHINA.2019.8855886 [retrieved on Oct. 2, 2019].

Y. Wu, et al., "A Survey of Physical Layer Security Techniques for 5G Wireless Networks and Challenges Ahead," in IEEE Journal on Selected Areas in Communications, vol. 36, No. 4, pp. 679-695, Apr. 2018, doi: 10.1109/JSAC.2018.2825560.

Baldi, "Coding with scrambling, concatenation, and HARQ for the AWGN wire-tap channel: A security gap analysis," IEEE Trans. Inf. Forensics Security, vol. 7, No. 3, pp. 883-894, Jun. 2012.

Goeland, "Guaranteeing secrecy using artificial noise," IEEE Trans. Wireless Commun., vol. 7, No. 6, pp. 2180-2189, Jun. 2008.

Haas, "Aeronautical channel modeling," IEEE Transaction on Vehicular Technology, vol. 51, No. 2, pp. 254264, Mar. 2002.

Tadayon et al. "Inflight Broadband Connectivity Using Cellular Networks" IEEE Access, vol. 4, pp. 1595-1606, 2016, doi: 10.1109/ACCESS.2016.2537648.

Y. Liu, H.-H. Chen, and L. Wang, "Physical layer security for next generation wireless networks: Theories, technologies, and challenges," IEEE Commun. Surveys Tut., vol. 19, No. 1, pp. 347-376, 1st Quart., 2017.

Zou, "A survey on wireless security: Technical challenges, recent advances, and future trends," Proc. IEEE, vol. 104, No. 9, pp. 1727-1765, Sep. 2016.

* cited by examiner

SECURE COMMUNICATION PROTOCOL

TECHNICAL FIELD

The present disclosure is concerned with communication protocols, and in particular with methods of securely transmitting information from a sender to a receiver, e.g. such that the information cannot be intercepted by third parties (eavesdroppers).

BACKGROUND

Various communication protocols exist that are able to securely transmit information. For instance, one example of a secure communication protocol is presented in HAMAMREH, 'Joint PHY/MAC Layer Security Design Using ARQ with MRC and Null-Space Independent PAPR-Aware Artificial Noise in SISO Systems', IEEE TRANSACTIONS ON WIRELESS COMMUNICATIONS, VOL. 17, NO. 9, September 2018, pp 6190-6204.

The communication protocol described in HAMAMREH involves a chase-combing automatic repeat request (CC-ARQ) protocol, in which analogue noise dependent on the quality of service requirements and a transmitter-legitimate receiver channel condition is added onto the data packet to be communicated. When the legitimate receiver requests a re-transmission, the transmitter adds an appropriately designed canceling noise to the next data packet. Then, at the receiver, a data packet free of the noise can be obtained using a maximal ratio combining process. Simultaneously the performance of an eavesdropper, who does not know the transmitter-legitimate receiver channel condition, deteriorates.

In avionic systems, air-to-ground (or, correspondingly, ground-to-air) communications may be safety critical, and as part of this, in order to meet the relevant functional safety standards, a higher degree of security is therefore required. For example, the remote control or communication of an avionic system requires consistent and reliable, secure communication between a transmitter and legitimate receiver. However, such air-to-ground communications consist of communicating along communication channels that may be relatively spaced apart, and in which there may be no clear or consistent line of sight. This may represent a relatively a harsh communications environment, e.g. where the signal to noise ratio (SNR) may be inherently relatively low, such that any communication protocol should desirably be sufficiently robust to address this.

Therefore, existing secure protocols may not always be suitable for such low signal to noise ratio (SNR) communication scenarios.

Another example of a communication protocol is the so-called 'hybrid automatic repeat request' (HARQ) scheme in which an original data packet is encoded with a forward error detecting (FEC) code. The FEC code is designed so as to correct a particular or expected subset of possible errors, whereas the ARQ method is used as a fall-back to correct errors that are unable to be corrected using the FEC method on its own.

HARQ communication schemes are already implemented in some modern communication systems (HSDPA, LTE, etc.). However, an issue regarding the security of a communication arises when using a traditional HARQ communication scheme in air-to-ground communication scenarios.

In particular, in air-to-ground communication scenarios, where the aircraft is moving, the quality of the eavesdropper-transmitter channel may in some cases be better than the transmitter-legitimate receiver channel. For example, this may occur due to the eavesdropper being spatially closer to the transmitter relative to the distance between the legitimate receiver and the transmitter.

Therefore, the air-to-ground communication is a so-called 'natural insecure' transmission.

In such a scenario, the signal quality along the eavesdropper-transmitter channel may be sufficiently high for the eavesdropper to be able to illegitimately decode the communications sent from the transmitter and intended for the legitimate receiver. Moreover, re-transmissions of the data packet according to the HARQ protocol may further increase the eavesdropper's ability to decode the data packet compared to the legitimate receiver.

Therefore, conventional HARQ communication schemes are not typically adopted for secure communications.

Thus, it would be desirable to provide an improved, secure communications protocol, in particular that is suitable for use for air-to-ground communications, and other such low signal to noise ratio (SNR) environments.

SUMMARY

A first aspect of the disclosure comprises a method of transmitting a message from a sender to a receiver, wherein the communication between the sender and receiver is performed using a hybrid automatic-repeat-request (HARQ) protocol in which a first data packet to be transmitted from a sender device to a receiver device comprises a first part representing the message to be transmitted and a second part representing an error detection code that can be used by the receiver to perform an error check on the first part of the first data packet, and in which, in the event that the error check fails, the sender device is triggered to transmit to the receiver device a second data packet comprising a corresponding first part representing the message to be transmitted and a second part representing a forward error correction code.

The method comprises:

(i) when a message is to be transmitted from the sender to the receiver: generating at the sender device a first data packet, the first data packet including a first part representing the message to be transmitted and a second part representing an error detection code for performing an error check on the first part of the data packet; and digitally introducing at the sender device a first artificial noise component to the first data packet by modifying a set of bits in the first data packet, whereby the first artificial noise value will cause the error check to fail thereby automatically triggering the sender device to transmit a second data packet;

(ii) the sender device transmitting the first data packet including the introduced first artificial noise component to the receiver device over a sender-receiver communications channel;

(iii) receiving the first data packet including the first artificial noise component at the receiver device, the receiver device performing an error check on the first data packet;

(iv) in response to determining that the error check has failed, the sender device generating a second data packet, the second data packet including a corresponding first part representing the message being transmitted and a second part representing a forward error correction code; wherein generating the second data packet further comprises the sender device digitally introducing a second artificial noise component to the second data packet by modifying a set of bits in the second data packet, whereby the second artificial noise component is generated such that the receiver can process the first and second data packets together to remove the introduced artificial noise components to extract the message;

(v) the sender device transmitting the second data packet including the second artificial noise component to the receiver device over the sender-receiver communications channel; and (vi) receiving the second data packet including the second artificial noise component at the receiver device and processing the first and second data packets together to extract the message.

There is thus provided a communication system that allows for secure communications between a sender device and a receiver device, located remotely from each other.

The above arrangement may provide various benefits compared to other possible approaches. In particular, the present disclosure recognizes that the combination of a hybrid automatic repeat request (HARQ) protocol with forward error correction (FEC), with the intentional introduction of artificial noise to the first data packet in such a manner that the HARQ protocol will automatically trigger (re-)transmission of a second data packet, can provide a particularly robust, secure communication scheme suitable for air-to-ground communications.

For instance, the above arrangements, similarly as in HAMAMREH's approach, encodes the communication by adding artificial noise to the transmitted data packets, with the artificial noise then forcing a re-transmission (an automatic repeat request, ARQ). Corresponding artificial noise is then added to the second data packet to allow the legitimate receiver to cancel the artificial noise that was added to the first data packet and thereby decode the first data packet appropriately. The artificial noise will however wholly deteriorate the signal for any illegitimate receivers (eavesdropping the communication) such that even if the illegitimate channel has a higher quality than the legitimate channel, the artificial noise means that the legitimate user is able to reliably decode the message whereas the eavesdropper cannot. This can help to provide privacy against eavesdropping.

In contrast to HAMAMREH, however, embodiments of the present disclosure uses a HARQ protocol with FEC. The use of a HARQ protocol with FEC may allow for a more robust communication protocol suitable for poor signal conditions such as long distance air-to-ground communications (e.g. as compared to the approach described in HAMAMREH (which does not use FEC) and may therefore not be suitable for such situations).

However, because the addition of FEC increases the length of the data packets, with different information potentially being sent in the first/second data packets (e.g., and especially, when using a HARQ-II protocol), the present disclosure recognizes that artificial noise should not simply be added to the data packets in an arbitrary manner, and there exists a need to be able to more controllably introduce artificial noise to the data packet.

Thus, the inventors have recognized that when introducing artificial noise to the data packets in this way, in order to facilitate the use of FEC, it is beneficial for the artificial noise to be introduced digitally, e.g., and in embodiments, before the transmission signal is converted into the analogue domain, as will be explained further below. That is, the artificial noise is added digitally prior to a modulator which is used to convert the digital signal into an analogue signal.

Furthermore, the digital artificial noise components are in embodiments of the present disclosure introduced before the FEC coding, such that the FEC advantageously covers both the message and the artificial noise. Again, this helps facilitate the use of FEC to provide an improved i.e. more secure and robust communication protocol.

For instance, in the approach proposed by HAMAMREH, in contrast, artificial noise is instead added to the analogue signal as it is being transmitted, i.e. after the data packet has been generated.

The present disclosure therefore provides a robust communication protocol for low signal to noise ratio environments, and is therefore particularly suited for use in air-to-ground avionic applications. For instance, in embodiments, the sender device may be provided on-board an aircraft, with the receiver device being located on the ground, e.g. in a control centre or control device for the aircraft (or vice versa with the receiver device being located on-board the aircraft).

The sender-receiver communication channel itself may use any suitable and desired protocol for transmitting the data packets to/from the sender and receiver devices. In fact it is possible, and it is a benefit of the approach described herein, that the sender-receiver communication channel may utilize existing communication systems such as HSDPA, LTE, etc., without requiring significant modification to the communication channel (or the receiver device). Thus, it is a benefit of the techniques described herein that there is no need for complex, dedicated hardware at the receiver side, at least in some embodiments.

That is, in embodiments, it is only the sender device that needs to have knowledge of the artificial noise, and the sender device introduces the artificial noise in such a manner within the HARQ/FEC protocol (e.g., by introducing artificial noise which is dependent on the transmitter-receiver channel parameters) so that the receiver device may (and in embodiments does) automatically remove the artificial noise to allow the receiver to decode the desired message accordingly.

The present disclosure also extends to the operation of the sender device itself.

Thus, another aspect of the present disclosure comprises a method of transmitting a message from a sender to a receiver, performed at a sender device, wherein the communication between the sender and receiver is performed using a hybrid automatic-repeat-request (HARQ) protocol in which a first data packet to be transmitted from the sender device to a receiver device comprises a first part representing the message to be transmitted and a second part representing an error detection code that can be used by the receiver to perform an error check on the first part of the first data packet, and in which, in the event that the error check fails, the sender device is triggered to transmit to the receiver a second data packet comprising a corresponding first part representing the message to be transmitted and a second part representing a forward error correction code, the method comprising:

(i) when a message is to be transmitted from the sender to the receiver:
generating a first data packet, the first data packet including a first part representing the message to be transmitted and a second part representing an error detection code for performing an error check on the first part of the data packet; and
digitally introducing a first artificial noise component to the first data packet by modifying a set of bits in the first data packet, whereby the first artificial noise component will cause the error check to fail thereby automatically triggering the sender to transmit a second data packet;

(ii) transmitting the first data packet including the introduced artificial noise component to the receiver device over a sender-receiver communications channel;

(iii) in response to the sender device determining that the error check has filed, the sender device generating a second data packet, the second data packet including a corresponding first part representing the message being transmitted and a second part representing a forward error correction code; wherein generating the second data packet further comprises digitally introducing a second artificial noise component to the second data packet by modifying a set of bits in the second data packet, whereby the second artificial noise component is generated to allow the first artificial noise component introduced to the first data packet to be removed at the receiver; and (iv) transmitting the second data packet including the second artificial noise component to the receiver over the sender-receiver communications channel.

The sender device may be configured for use as part of the method and system described above and may therefore (and in embodiments does) comprise any and all of the optional features described above in relation to the first and second aspects of the present disclosure.

The first and second data packets can be processed together at the receiver to remove the artificial noise components and extract the message. Whilst in embodiments this is done using first and second data packets (only), in other embodiments this may be done using more than two data packets, with each data packet's respective artificial noise component being generated such that when all of the data packets are suitably combined the artificial noise components are canceled, to allow the message to be extracted. Various arrangements would be possible in this regard.

For instance, in the aspects described above the communication is based on hybrid automatic-repeat-request (HARQ) protocol, in which a second data packet is transmitted in response to determining that an error check performed at the receiver has failed. For example, in response to the receiver determining that the error check has failed, the receiver may send a negative acknowledgment signal (NACK) to the sender, which negative acknowledgment signal (NACK) triggers the sender to transmit a second data packet. However, other arrangements would be possible for triggering the second transmission. For instance, the sender may automatically transmit a second data packet after a time-out conditions, e.g. in response to not receiving a positive acknowledgment signal from the receiver.

However, it would also be possible to introduce artificial noise this way in other communications, that do not rely on a hybrid automatic-repeat-request (HARQ) protocol. For instance, the sender may predetermine that it will send a set of M data packets, and can then generate the artificial noise components appropriately based on its knowledge that it will send such set of M data packets. For example, the number of transmissions may be determined based on the channel quality. In this way it is possible to effectively take advantage of the low channel quality by distributing the artificial noise components across the set of M data packets such that the message can only be extracted once the whole set of M data packets is received.

A further aspect of the disclosure thus comprises a method of transmitting a message from a sender to a receiver, the method comprising:

(i) when a message is to be transmitted from the sender to the receiver:

the sender determining that a set number of plural data packets should be transmitted from the sender to the receiver;

generating at the sender a first data packet, the first data packet including a first part representing the message to be transmitted; and digitally introducing a first artificial noise component to the first data packet by modifying a set of bits in the first data packet;

(ii) transmitting the first data packet including the introduced first artificial noise component to the receiver over a sender-receiver communications channel;

(iii) receiving and digitally storing the first data packet including the first artificial noise component at the receiver;

(iv) repeating steps (i)-(iii) for one or more further data packets up to the set number of data packets to be sent from the sender to the receiver, each data packet including a first part representing the message to be transmitted and a respective artificial noise component, whereby the artificial noise components of the one or more further data packets are generated such that when the set number of data packets are processed together at the receiver their respective artificial noise components can be removed so that the message can be extracted; and (vii) the receiver processing the set of plural data packets together to extract the message.

A yet further aspect of the disclosure comprises a method (performed at the sender device) of transmitting a message from a sender to a receiver, the method comprising:

(i) when a message is to be transmitted from the sender to the receiver:

the sender determining that a set number of plural data packets should be transmitted from the sender to the receiver;

generating at the sender a first data packet, the first data packet including a first part representing the message to be transmitted; and digitally introducing a first artificial noise component to the first data packet by modifying a set of bits in the first data packet;

(ii) transmitting the first data packet including the introduced first artificial noise component to the receiver over a sender-receiver communications channel; and (iii) repeating steps (i)-(ii) for one or more further data packets up to the set number of data packets to be sent from the sender to the receiver, each data packet including a first part representing the message to be transmitted and a respective artificial noise component, whereby the artificial noise components of the one or more further data packets are generated such that when the set number of data packets are processed together at the receiver their respective artificial noise components can be removed so that the message can be extracted.

In these aspects, the number of transmissions to be sent from the sender to the receiver may, e.g., be determined as a function of a desired through-put level and a sender-receiver communication channel signal-to-noise ratio. The receiver may also have knowledge of the set number of data packets being transmitted. For example, the receiver may independently determine how many data packets should be transmitted, e.g. using the same function as the sender, based on the desired through-put level and a sender-receiver communication channel signal-to-noise ratio. Or, the number of data packets may be generated at one of the sender or receiver and then transmitted to the other appropriately.

Other arrangements would however be possible. For instance, it would be possible that the receiver does not know how many data packets to expect, but the processing at the receiver can nonetheless determine when a sufficient number of data packets (i.e. the set number) has been received to extract the message. For instance, the receiver may process all of the received data packets each time a new data packet is received and may thus be able to dynamically determine whether the full set of data packets has been received, e.g. based on the result of the processing, e.g. based on the processing providing a coherent message.

The method and sender device in these further aspects may (and in embodiments does) comprise any and all of the optional features described above in relation to the first aspect of the present disclosure to the extent they are not mutually exclusive.

Embodiments will now be described, by way of example only, with reference to the drawings.

DETAILED DESCRIPTION

The present disclosure relates to secure communication protocols. A particular example will be described now in relation to an aircraft communication system, such as an air-to-ground (or ground-to-air) communication between an aircraft and a ground-based receiver. However besides aerospace, the technology described herein may also find utility in other any other suitable such systems in which secure communications may be desired such as automotive vehicle-to-everything (V2X) wireless communication systems, tactical communications (e.g. military), unmanned vehicles, surveillance, or the like.

Figure 1:
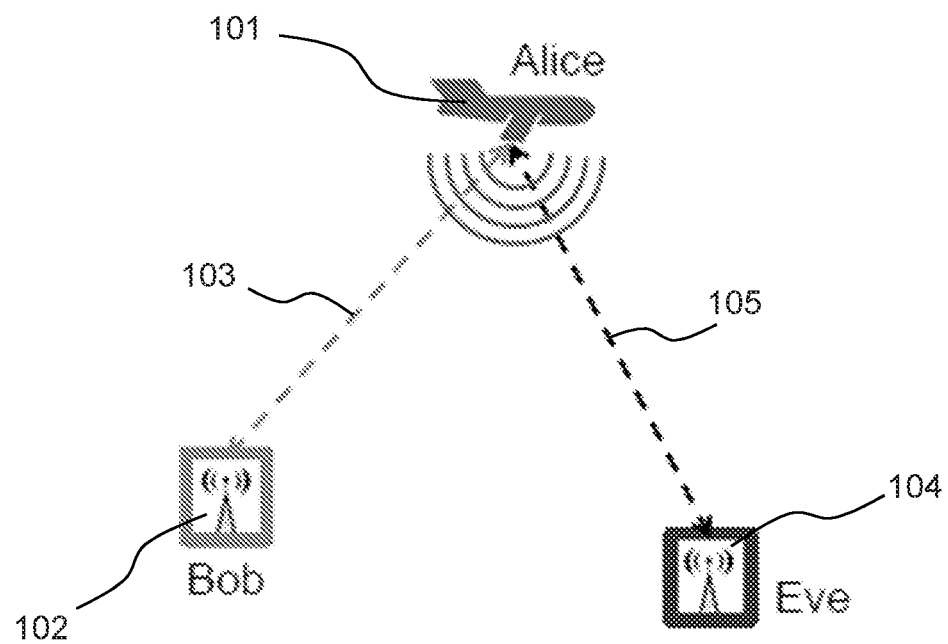
FIG. 1 is a diagram illustrating air-to-ground communication.

FIG. 1 shows a diagram illustrating air-to-ground communication between a transmitter or sender 101, denoted as Alice, and an intended receiver 102, denoted as Bob. The transmitter 101 and the intended receiver 102 are legitimate users, wherein information is to be securely transmitted through signals from the transmitter 101 to the intended receiver 102 along a legitimate transmitter-receiver channel 103. The transmitter 101 may comprise an isotropic transmitter or antenna such that signals comprising information are distributed over a range of directions. As will be appreciated, the channel conditions may be time-varying such that the channel state information (CSI) will correspondingly be time-varying. For example, if the transmitter 101 is moving relative to the legitimate receiver 102, the channel state information (CSI) may be time varying due to the corresponding Doppler shift. Many other variables may contribute to time-varying channel conditions, such as variable weather or variable cosmic radiation (e.g. from solar events).

Also shown in FIG. 1 is an illegitimate receiver or eavesdropper 104, denoted as Eve. The eavesdropper 104 may also receive signals from the transmitter 101 along a transmitter-eavesdropper channel 105. The eavesdropper 104 may, for instance, be a passive listener of the signals from the transmitter 101 intended for the intended receiver 102.

The transmitter 101 may be in a route phase of flight. As will be understood, in some scenarios the transmitter-eavesdropper channel 105 may be better than the legitimate transmitter-receiver channel 103. For example, in some instances, the eavesdropper 104 may be physically closer to the transmitter 101 than the legitimate receiver 102. Moreover, the eavesdropper 104 may be able to jam or interfere with the legitimate transmitter-receiver channel 103 so as to deteriorate or reduce the signal to noise ratio (SNR) along the legitimate transmitter-receiver channel 103.

Figure 2:
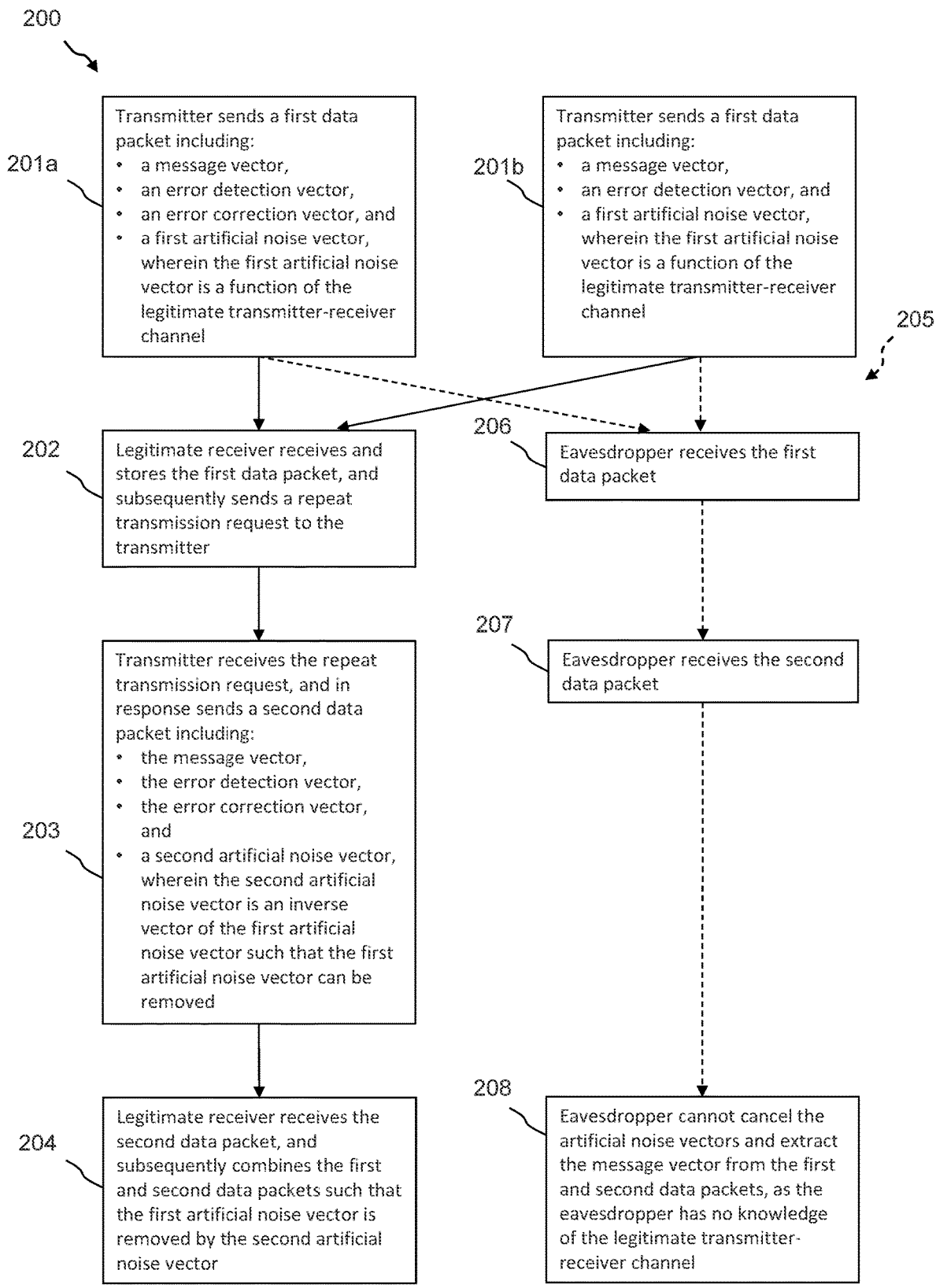
FIG. 2 is a block diagram of a secure communication protocol between the transmitter and legitimate receiver.

FIG. 2 is a block diagram of a secure communication protocol between the transmitter 101 and legitimate receiver 102. The steps of legitimate communication are shown along branch 200 indicated by solid line arrows. At step 201a, the transmitter sends a first data packet including a message vector, an error detection vector, an error correction vector, and a first artificial noise vector, wherein the first artificial noise vector is a function of the legitimate transmitter-receiver channel. Alternatively, at step 201b, the transmitter instead sends a first data packet including a message vector, an error detection vector, and a first artificial noise vector, wherein the first artificial noise vector is a function of the legitimate transmitter-receiver channel. At step 202, the legitimate receiver receives the first data packet and subsequently sends a repeat transmission request to the transmitter. At step 203, the transmitter receives the repeat transmission request, and in response sends a second data packet including the message vector, an error detection vector, an error correction vector and a second artificial noise vector, wherein the second artificial noise vector is an inverse vector of the first artificial noise vector such that the first artificial noise vector can be removed. At step 204, the legitimate receiver receives the second data packet, and subsequently combines the first and second data packets such that the first artificial noise vector is removed by the second artificial noise vector. The data packets may be combined for example by using a maximal ratio combiner (MRC) at the receiver. Alternatively or in addition to, other combining methods or diversity techniques may be used, such as selection combining (when the incoming signal with the maximal SNR is selected) or equal gain combining (wherein the same gain is set for each branch of the receiver and the phase of the incoming signals is modified so as to add constructively).

FIG. 2 also shows the steps of attempted eavesdropping along branch 205 indicated by dashed line arrows. At step 206, the eavesdropper receives the first data packet. At step 207, the eavesdropper receives the second data packet. At step 208, the eavesdropper cannot cancel the artificial noise vectors and extract the message vector from the first and second data packets, as the eavesdropper has no knowledge of the legitimate transmitter-receiver channel.

Therefore, as will be understood, the above protocol is a combination of FEC with an automatic-repeat-request (ARQ) method, and is referred to as a hybrid automatic-repeat-request (HARQ) protocol. In particular, the inventors have discovered that embedding artificial noise with a HARQ protocol as discussed above may allow for improved robustness of the message vector against noise and interference, e.g. in contrast to not using FEC.

HARQ Type-I with Artificial Noise

In the following mathematical formulation, bold indicates vectors of digital values and bold italic indicates vector for analog values. In a first example, at step 201a, the transmission of the first data packet at the receiver may be described as $$\tilde{y}_1 = h_{b1}(x+d+c+r_1)+n_1, \quad (1)$$

where: $h_{b1}$ is the transfer function of the legitimate transmitter-receiver channel (i. e. the channel response) at the time of the transmission of the first data packet; x is the message vector; d is the error detection vector, for example a cyclic redundancy check (CRC); c is the error correction vector (FEC); $r_1$ is the first artificial noise vector; and $n_1$ is natural noise not intrinsic to the communication system at the time of the transmission of the first data packet, and which may for example be described as additive white Gaussian noise (AWGN) but may also include additional noise arising from non-random processes such as interference, ground clutter, self-interference and terrain blocking. In particular, as the protocol requires forced re-transmission so as to cancel $r_1$, the error detection vector may be initially sent with one or more incorrect bits, such as one or more incorrect CRC bits. For example, $r_1$ may be designed so as to automatically force re-transmission. That is, $r_1$ may purposively contribute to one or more incorrect bits of the error detection vector such that application of the error detection code to the first data packet $y_1$ will purposively produce an error.

At step 202, the legitimate receiver 102 receives the first data packet $\tilde{y}_1$ and it multiplies this signal by the complex conjugate of the channel response $h^*_{b1}$. The legitimate receiver 102 may then map the resulting signal to the closer symbol using a Maximum-A-Posteriori receiver, and after applying the FEC decoder (e.g. a Viterbi decoder) it obtains a set of bits:

$$\bar{y}_1 = \bar{x} + \bar{r}_1 + \bar{d} \quad (2)$$

where: $\bar{x}$ is the digital (decoded) message vector, $\bar{r}_1$ is the first (digital) artificial noise vector; and $\bar{d}$ is the digital error detection vector. The receiver applies the error detection code (e.g., CRC) to decide whether the data is successfully received or not. Since the artificial noise is present in the received vector, the CRC detects an error and the protocol stores $\bar{y}_1$ in a digital buffer. The legitimate receiver 102 then asks for retransmission from the transmitter (e.g., the legitimate receiver 102 sends a negative acknowledgment (NACK) to the transmitter 101, which indicates a repeat transmission request).

At step 203, the transmitter receives the repeat transmission request, and in response sends a second data packet, which may be described as:

$$\tilde{y}_2 = h_{b2}(x+d+c+r_2)+n_2, \quad (3)$$

where: $h_{b2}$ is the transfer function of the legitimate transmitter-receiver channel at the time of the transmission of the second data packet; $r_2$ is the second artificial noise vector; and $n_2$ is natural noise not intrinsic to the communication system at the time of the transmission of the second data packet.

At step 204, the legitimate receiver 102 receives the second data packet $\tilde{y}_2$, and it multiplies this incoming signal by the complex conjugate of the channel response $h^*_{b2}$. The legitimate receiver 102 may then map the resulting signal to the closer symbol using a Maximum-A-Posteriori receiver, and after applying the FEC decoder (e.g. a Viterbi decoder) it obtains a set of bits:

$$\bar{y}_2 = \bar{x} + \bar{r}_2 + \bar{d} \quad (4)$$

where: $\bar{x}$ is the digital (decoded) message vector, $\bar{r}_2$ is the second (digital) artificial noise vector and; $\bar{d}$ is the digital error detection vector. The first decoded $\bar{y}_1$ and the second decoded $\bar{y}_2$ data packets may then be combined at the legitimate receiver 102 such that the first artificial noise vector is removed by the second artificial noise vector. As an example, a simple addition of Equation (3) and (4) leads to:

$$\bar{y}_1 + \bar{y}_2 = \bar{x} + \bar{x} + \bar{r}_1 + \bar{r}_2 + \bar{d} + \bar{d} \quad (5)$$

Accordingly, this may be possible if the digital noise vectors satisfy the noise-cancellation criteria:

$$\bar{r}_1 + \bar{r}_2 = 0 \quad (6)$$

The noise-cancellation criteria may be forced because the transmitter 101 knows the parameters of the legitimate receiver's 102 channel, i.e. the transmitter 101 is aware of $h_{b1}$ and $h_{b2}$ either by its own probing of the channel or by CSI obtained from the legitimate receiver 102. Accordingly, at steps 201a and 203, the transmitter 101 may set the first and second artificial noise vectors such that the corresponding analog errors satisfy:

$$r_1|h_{b1}|^2 + r_2|h_{b2}|^2 = 0, \quad (7)$$

and are canceled in Equation (5) as a result. For example:

$$r_1 = \frac{g}{|h_{b1}|^2}, \quad (8)$$

and $$r_2 = -\frac{g}{|h_{b2}|^2}, \quad (9)$$

where g is the artificial noise key vector. As a result, the artificial noise vectors are canceled. It will be appreciated that the eavesdropper 104, who illegitimately receives the first $y_1$ and second $y_2$ data packets, cannot also combine them and cancel the artificial noise vectors $r_1$ and $r_1$ in the same way, as the eavesdropper 104 lacks knowledge of both $h_{b1}$ and $h_{b2}$ as well as the key g. Moreover, the artificial noise key vector g is not transmitted in the open as the legitimate receiver 102 does not need to know it.

The above example is referred to as a HARQ type-I with artificial noise protocol, which has the advantages of increasing the robustness of the communication (e.g. lower bit error rate or packet error rate), or conversely requiring a lower power to be used in the transmission to achieve a similar communication performance to the communication had HARQ type-I not been used.

Figure 3A:
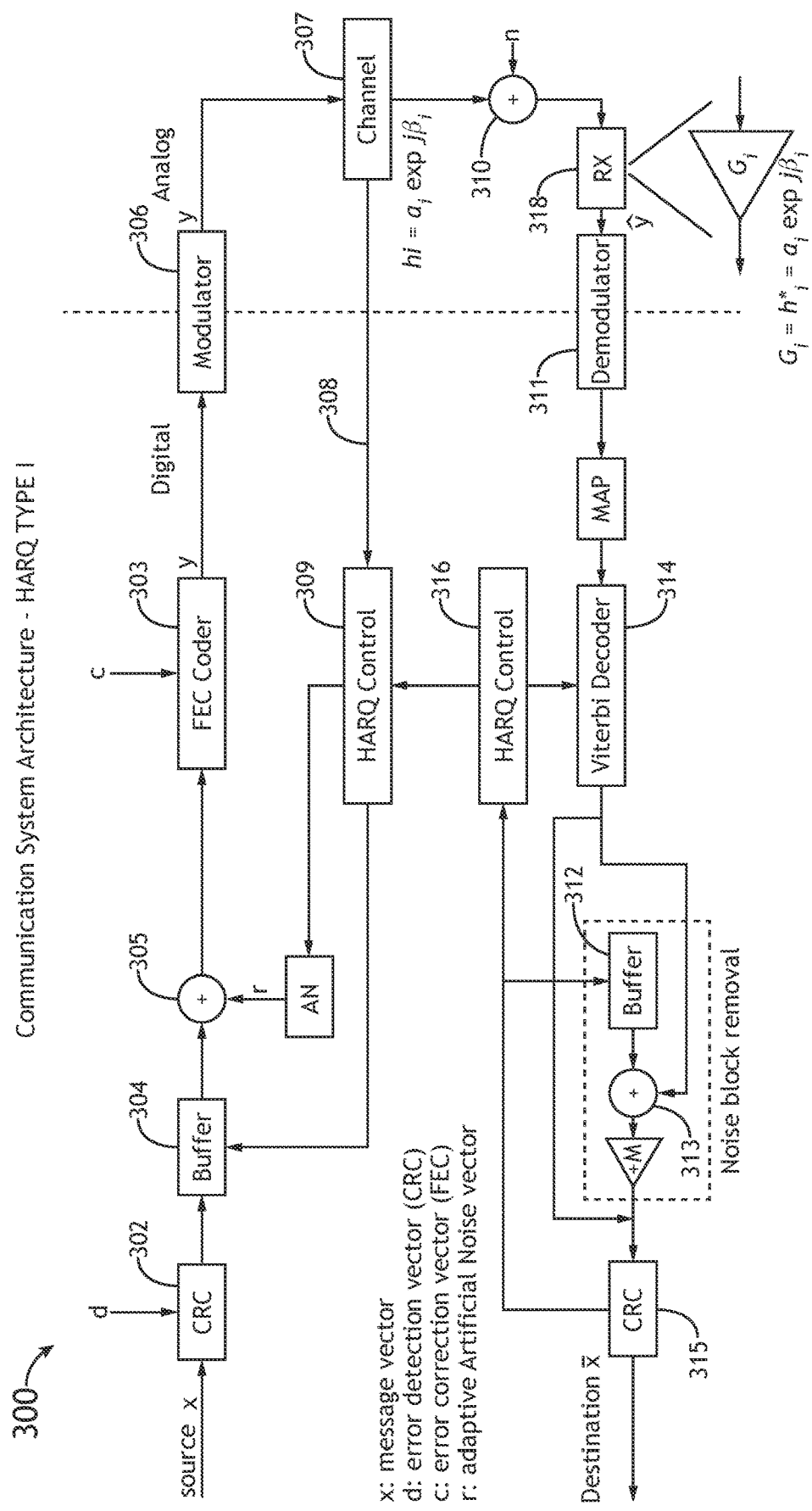
FIG. 3A is a schematic of a communication system architecture for a HARQ type-I with artificial noise protocol.

Referring now to FIG. 3A, there is shown an exemplary communication system architecture 300 for the HARQ type-I with artificial noise protocol. The communication system architecture 300 for the HARQ type-I with artificial noise protocol begins with a first transmission sequence, wherein message bits are formed and to which CRC bits 302 are added. The message bits and CRC bits are stored in a suitable buffer for transmission (TX buffer) 304. Simultaneously, parameters of the channel 307 are fed back to the transmitter HARQ control 309 through feedback channel 308, either by probing of the channel 307 or provision of CSI from channel 307. The parameters of the channel 307 are used to add artificial noise bits 305 to the message bits and CRC bits to form combined digital data bits, and the parameters of the channel 307 are also stored in the TX buffer 304. FEC coder bits 303 are subsequently added to the combined digital data bits to form HARQ digital data bits to be transmitted. The HARQ digital data bits are then converted into an analogue signal by modulator 306 and is transmitted through channel 307, wherein natural noise 310 not intrinsic to the communication system is added to the analogue signal. The communication system architecture 300 further comprises a node 318 which may be an amplifier 318 tuned with the channel or a maximal ration combiner without memory, such as an analogue MRC, configured to remove or minimize the influence of natural noise 310 from the first analogue signal prior to demodulation. The analogue signal is then received and converted back into received digital bits at the demodulator 311, and the received digital bits are then input into an FEC decoder 314 (such as a Viterbi decoder 314) and the resulting output is stored in a suitable buffer at the receiver (RX buffer) 312 as a first input into a digital combiner (noise block removal) 313 such as a maximal ratio combiner (MRC), prior to being subject to a CRC error detection check 315. Due to the artificial noise bits 305 present within the received digital data bits, the CRC error check will fail and the receiver HARQ control 316 sends a negative acknowledgment message (NACK) to the transmitter HARQ control 309.

Upon receipt of the NACK, the transmitter HARQ control 309 instigates a second transmission sequence, wherein re-transmission HARQ digital data bits are formed from the message bits with CRC bits 302 and FEC coder bits added. Simultaneously, parameters of the channel 307 at the time of re-transmission are fed back to the transmitter HARQ control 309 through feedback channel 308. A second set of artificial noise bits 305 is calculated from the initial message bits and CRC bits stored in the TX buffer 304 and parameters of the channel 307 at the time of re-transmission, such that the second set of artificial noise bits 305 can be canceled with the first transmission set of artificial noise bits 305 at the digital noise block removal 313 at the receiver side. The second transmission sequence then proceeds in the same way as the first transmission sequence as described above, i.e. the steps from forming the combined digital data bits for the second transmission sequence and storing parameters in the TX buffer 304, through to receiving digital bits of the second transmission sequence and storing them in the RX buffer 312 as a second input into the digital noise block removal 313, are substantially the same as for the first transmission sequence. At the digital noise block removal 313, the first and second inputs are combined to form a received signal estimate bits, which cancels the first set of artificial noise bits with the second set of artificial noise bits. The received signal estimate bits are then subject to a second CRC error detection check. If the second CRC error check does not detect any errors, then the receiver HARQ control 316 sends a positive acknowledgment message (ACK), and estimated message bits are able to be extracted.

A draw-back of the above HARQ type-I with artificial noise protocol is that, once the coding rate is fixed, all parity/error detection bits for error correction are transmitted even if they are not all needed, thus reducing the efficiency of the transmission and suffering capacity loss in strong signal conditions.

HARQ Type-II with Artificial Noise

In an alternative second example, at step 201b, the transmission of the first data packet may be described as $$\tilde{y}_1 = h_{b1}(x+d+r_1)+n_1, \tag{10}$$

where the variables take the same definitions as described above. Notably, compared to Equation (1), Equation (10) does not include the error correction vector (FEC) c, and as such this example is referred to as a HARQ type-II with artificial noise protocol.

Steps 202 and 203 are the same as described above. That is, at step 202, the legitimate receiver 102 receives, decodes and stores the first data packet $\bar{y}_1$ as in Equation (2) but without using the FEC decoder (since FEC vector is not present), and subsequently sends or otherwise communicates a NACK to the transmitter 101. At step 203, the transmitter responds by sending a second data packet $\tilde{y}_2$ as described by Equation (3).

At step 204, the legitimate receiver (102) receives and decodes the second data packet $\bar{y}_2$ and it combines it with the first data packet $\bar{y}_1$ as in Equation (5). Observe that, the FEC data are not present because Equation (5) applies after the FEC (e.g. Viterbi) decoder. As will be appreciated, the HARQ type-II with artificial noise protocol does not suffer capacity loss in strong signal conditions, as FEC bits are only transmitted on subsequent re-transmissions as needed.

Accordingly, in a similar way as above, at steps 201b and 203, the transmitter 101 may set the first and second artificial noise vectors according to Equations (8) and (9) such that they satisfy the noise-cancellation criterion of Equation (6)-Equation (7).

At step 204 of the above protocols, the legitimate receiver 102 may send a positive acknowledgment (ACK) message to the transmitter such that the transmitter 101 does not send further re-transmissions. Alternatively, as will be understood, the above protocols may readily be extended to require more than one repeat transmission. For example, the error detection vector d of the second data packet may also include incorrect CRC bits such that the transmitter sends at least a third data packet. Thus, in general, in all embodiments of the disclosure, the artificial noise may be distributed across any suitable number of data packets in such a way that when all of the data packets are processed together the artificial noise can be removed to extract the message.

Figure 3B:
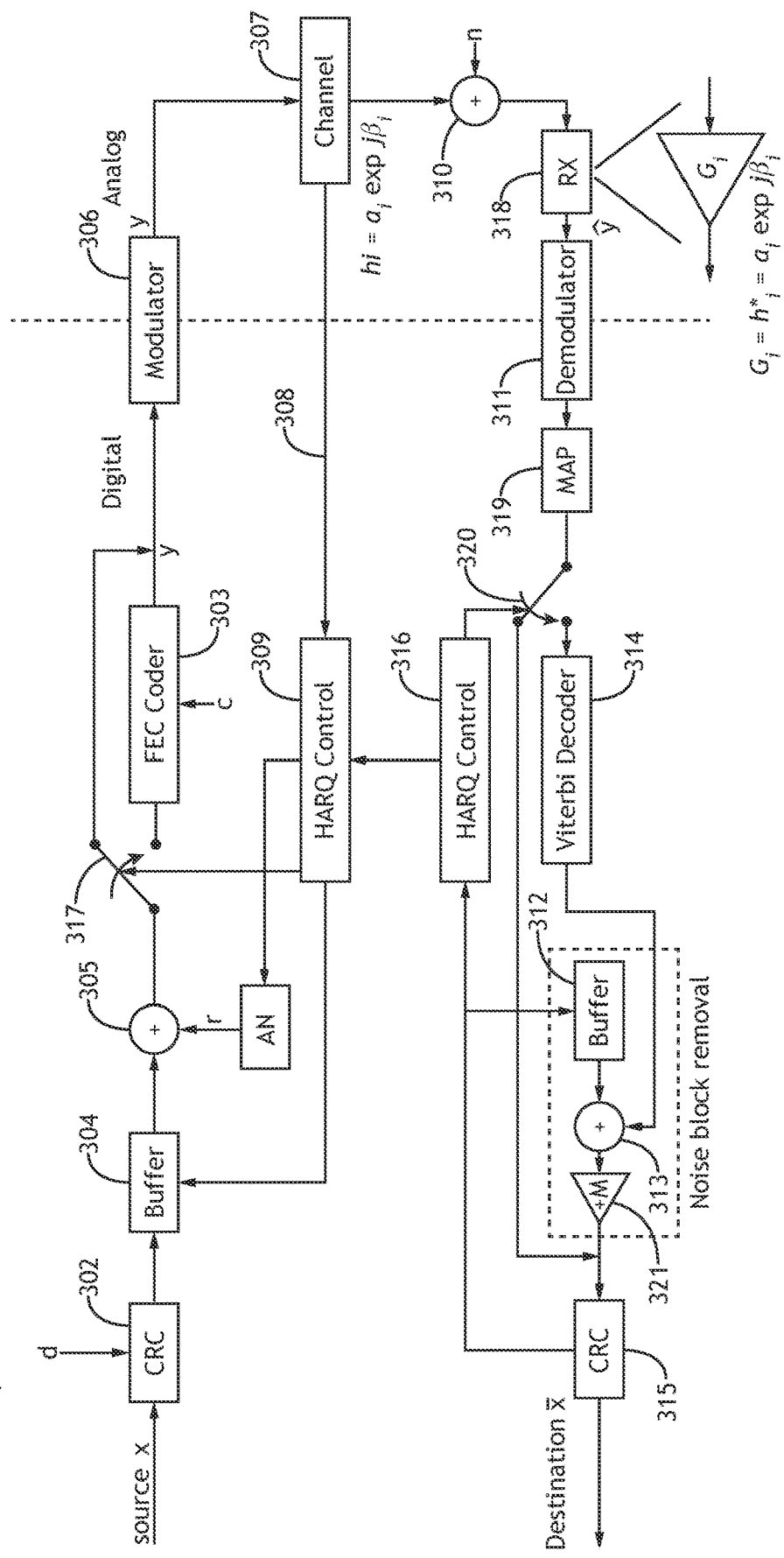
FIG. 3B is a schematic of a communication system architecture for a HARQ type-II with artificial noise protocol.

Referring now to FIG. 3B, there is shown a communication system architecture 301 for the HARQ type-II with artificial noise protocol. Many of the elements of the communication system architecture 301 for the HARQ type-II with artificial noise protocol are identical to corresponding elements in the communication system architecture 300 of FIG. 3A and function in an identical way. These components have been given the same reference numerals as they have in FIG. 3A and, in the interests of brevity, will not be described in detail again.

In the communication system architecture 301 for the HARQ type-II with artificial noise protocol, the transmitter 309 and receiver 316 HARQ controls further comprise switching protocols 317 and 320, respectively. The communication system architecture 301 for the HARQ type-II with artificial noise protocol begins with a first transmission sequence, wherein message bits are formed and to which CRC bits 302 are added, a similar way as described above in relation to FIG. 3A. However, the transmitter switching protocol 317 is set such that FEC coder bits 303 are not added during the first transmission sequence. Rather, as shown in FIG. 3B, a first set of artificial noise bits 305 are added to the combined message and CRC bits to form a first combined set of digital data bits without FEC coder bits 303. The first combined set of digital data bits are modulated and transmitted in a similar way as described above in relation to FIG. 3A.

The analogue signal is then converted into received digital bits and passed subject to a maximal a posteriori probability estimate (MAP) 319 so as to yield a first set of received digital bits without the influence of natural noise. During the first transmission sequence, the receiver switch protocol 320 is set such that the first set of received digital bits are subject to a CRC error detection check 315 without passing through FEC decoder 314. That is, in the first transmission sequence, the first set of artificial noise bits can be added without having to consider intermixing the first set of artificial noise bits with the functionality of the FEC coder 303.

In a similar way as described above in relation to FIG. 3A, due to the artificial noise bits 305 present within the received digital data bits, the CRC error check will fail and the receiver HARQ control 316 sends a NACK to the transmitter HARQ control 309 and also stores the first set of received digital bits in a suitable buffer at the receiver (RX buffer) 312.

Upon receipt of the NACK, the transmitter HARQ control 309 instigates a second transmission sequence and sets the transmitter switching protocol 317 such that re-transmission HARQ digital data bits are formed from the message bits with CRC bits 302, a second set of artificial noise bits 305, and wherein FEC coder bits 303 are added. As will be appreciated, the second set of artificial noise bits are designed in a similar way as described in relation to FIG. 3A, however they must also be added so as to not interfere with the FEC coder bits 303.

The second transmission sequence then proceeds in the same way as the first transmission sequence as described above, however the receiver HARQ controller 316 sets the receiver switch protocol 320 such that the received re-transmission HARQ digital data bits (comprising message bits, CRC bits, and FEC bits) are then input into the FEC decoder 314. After FEC decoding, the bits are combined with the first set of bits in the RX buffer 312 so as to mutually cancel the first and second artificial noise bits to form received signal estimate bits. The received signal estimate bits are subject to a second CRC error detection check 315. If the second CRC error check does not detect any errors, then the receiver HARQ control 316 sends a positive acknowledgment message (ACK), and estimated message bits are able to be extracted.

As will be understood for both of the above protocols, if the second CRC error detection check detects an error, then a further NACK message can be sent to the transmitter, and the first transmission and re-transmission processes can be repeated, with the artificial noise bits modified accordingly. As will be understood, the NACK or ACK need not be signals explicitly sent from the receiver to the sender. For example, the negative acknowledgment may be an implied negative acknowledgment comprising an absence of acknowledgment signal being sent from the receiver to the sender over a pre-determined time period, and wherein interpreting the negative acknowledgment at the sender comprises recognizing the absence of acknowledgment signal over the pre-determined time period (e.g. a time-out). The sender may thus determine that the error check has failed either in response to an explicit NACK signal from the receiver, or implicitly based on the absence of a positive ACK signal. Other arrangements would also be possible. Thus, the skilled person will understand that other arrangements than transmitting a NACK message would also be possible for triggering the sender to transmit a second or further data packet.

M-Transmissions with Artificial Noise

As mentioned above, the artificial noise may in general be distributed across any number of data packets. The sender can thus exploit this by predetermining that a set of plural data packets should be transmitted, even without using the HARQ protocol described above. Thus, alternatively or additionally, the artificial noise bits may be designed to explicitly require a plurality of re-transmission sequences so as to mutually cancel the different sets of artificial noise bits. Indeed, increasing the number of re-transmission sequences may increase the level of security of the entire communication protocol, however at the cost of a reduced throughput. The max value of number of retransmissions can be established by the desired level of throughput that the secure physical layer is to provide to the upper layers within the communication layers hierarchy.

Moreover, in particular for the HARQ type-II with artificial noise protocol, further re-transmissions allow the bits to be re-transmitted to be encoded in different ways at each re-transmission so as to further increase the level of security.

The number of retransmissions M may, for example, be set in accordance with the sender-receiver channel. Since a harsh communication channel (i.e. low SNR channel) needs more retransmissions to transmit the information properly, the proposed strategy can exploit poor channel performance to provide a secure communication. That is, if the channel is bad, the system knows many retransmissions are needed to deliver the information, and thus the retransmissions can be exploited for adding security. The maximal number of retransmissions may depend on the application, i.e. throughput and/or latency requirement.

Figure 4:
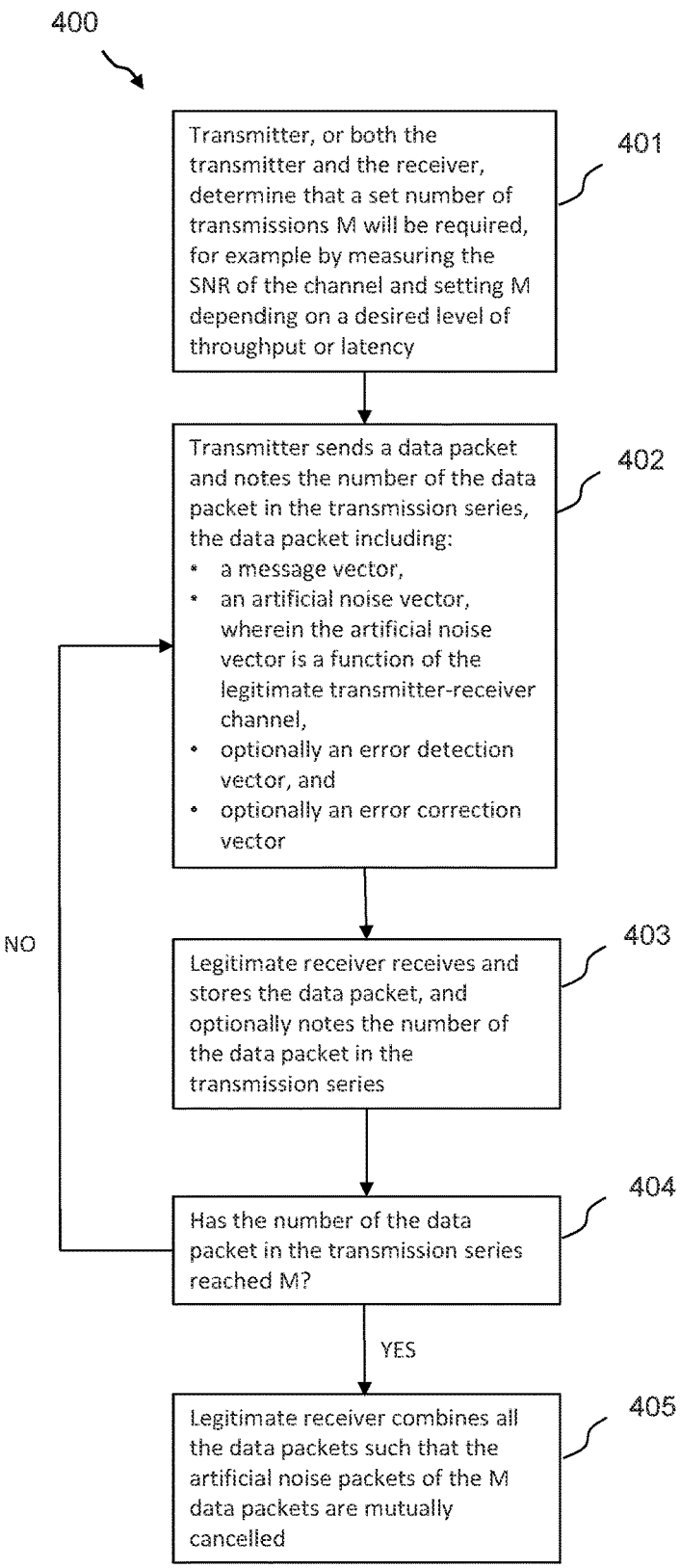
FIG. 4 is a block diagram of another embodiment of a secure communication protocol between the transmitter and legitimate receiver.

For example, FIG. 4 shows a block diagram of an embodiment of a secure communication protocol between the transmitter 101 and legitimate receiver 102 which exploits M-transmissions with artificial noise. At step 401, for a desired throughput level and a given/measured signal-to-noise ratio of the sender-receiver communication channel, either the sender or both the sender and the receiver can set the total number of transmissions M required (i.e., which includes the initial transmission and M-1 retransmissions). That is, setting the number M comprises setting the number at the sender, or setting the number at the sender and the receiver. The above transmission steps can then be followed, with the exception that no ACK/NACK is explicitly required to force a retransmission, rather the total number of transmissions is pre-determined the specified number of times (i.e. retransmission is automatic).

For example, at step 401, the transmitter sends a data packet including a message vector and an artificial noise vector, wherein the artificial noise vector is still a function of the legitimate transmitter-receiver channel. As will be discussed below, the transmitter may optionally include an error detection vector and may also optionally include an error correction vector. At step 402, the transmitter will also note the number of the data packet in the transmission series (e.g., first data packet, second data packet, . . . , $m^{th}$ data packet).

At step 403, the legitimate receiver receives and stores the data packet. Optionally, at step 403, the legitimate receiver notes the number of the data packet in the transmission series. For example, if the receiver is also able to set the number of transmissions required, then the receiver may also note the number of each transmission and thus is able to determine that the transmission series has terminated after M transmissions.

At step 404, the transmitter and the receiver determine whether the number of the data packet is the $M^{th}$ data packet in the transmission series (i.e., the pre-determined final data packet). For example, at step 402, the transmitter will have noted the number of each transmission and will stop transmitting further data packets after M transmissions. Accordingly, at step 404, the receiver may determine that the transmission series has terminated after not receiving a subsequent transmission after a pre-determined time-interval, or is otherwise informed by the transmitter. Alternatively, as mentioned above, if the receiver is also able to set the number of transmissions required (i.e. determines M independently of the transmitter), then the receiver is able to determine that the number of the data packet is the $M^{th}$ data packet in the series.

If the data packet is not the $M^{th}$ data packet in the series, then steps 402-404 are iterated until the number of the data packet reaches M.

As mentioned above, at step 401, the transmitter may send a data packet also including an error detection vector. That is, error check bits may still be provided for the purposes of detecting normal transmission errors. For example, if an error check does happen to indicate the presence of a transmission error (e.g. arising from the natural noise), then the receiver may send a NACK to the transmitter, and the transmitter may send a corresponding NACK-induced re-transmission for the specific transmission in the series which produced the error. A subsequent ACK would indicate that that specific transmission in the series has now been successfully received such that the transmitter can continue to transmit the subsequent transmissions in the series.

In addition, at step 401, the transmitter may send a data packet also including an error correction vector. That is, similar to the HARQ-based protocols described above, FEC may be added to each transmission within the series (HARQ-I), or only to the final transmission in the series (HARQ-II). Furthermore, FEC may be added to one or more of the transmissions in the series (e.g., on only a subset of the transmissions in the series). For example, if the quality of the sender-receiver channel is detected/indicated as being particularly bad for a particular transmission, then FEC may be added to that particular transmission so as to improve the robustness of that particular transmission.

Once the number of the data packet reaches M, at step 405, the receiver combines all the data packets such that the artificial noise packets of the M data packets are mutually canceled. As will be understood, if $r_m$ is the artificial noise vector added to the $m^{th}$ data packet in the series (where m=1, 2, ..., M), then the artificial noise vectors will be generated so as to satisfy the following criterion:

$$\sum_{m=1}^{M} \bar{r}_m = 0. \qquad (11)$$

Digital Artificial Noise

Figure 5A:
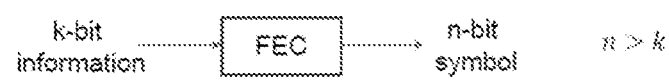
FIG. 5A is a schematic of a bitstream of k-bits input into an FEC coder, which outputs an n-bit symbol.
Figure 5B:
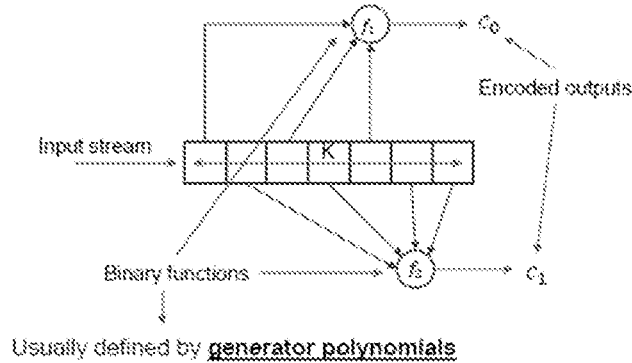
FIG. 5B is a schematic of a K-length encoder.
Figure 5C:
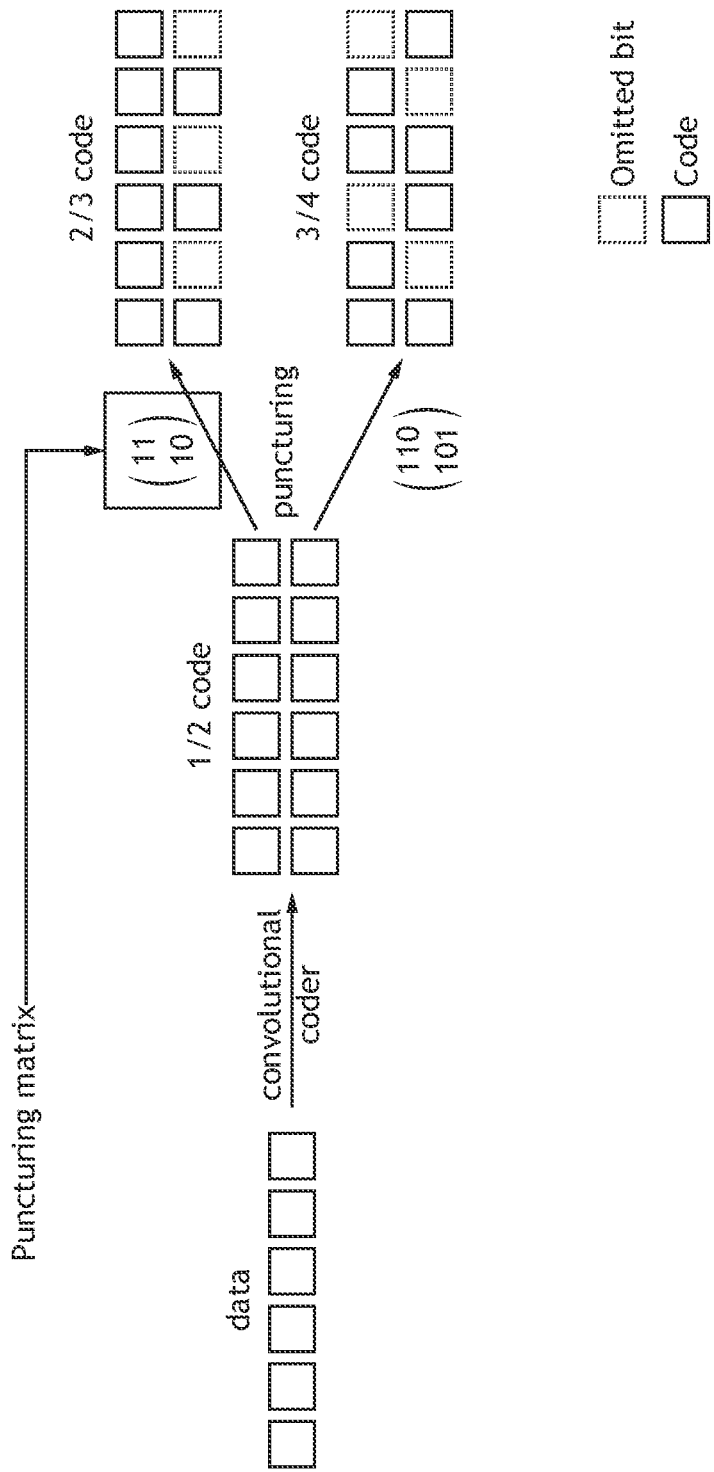
FIG. 5C is a schematic of an FEC puncturing operation.

As shown in FIGS. 5A-5C, FEC functions by adding redundant bits to the data packet to help detect and correct some transmission errors without the need for retransmission. FIG. 5A schematically shows a bitstream of k-bits input into an FEC coder, which outputs an n-bit symbol or codeword, wherein n is greater than k. As shown in FIG. 5B, k-bit at a time enter into a K-length encoder (usually k=1, that is, only 1 bit at a time (sample) enters in the encoder). The encoder outputs n encoded bits, wherein the values are generated by binary functions (such as generator polynomials). The n encoded bits depend on K values. As will be appreciated, FEC adds increasing redundancy which lowers the 'goodput' (i.e. the application-level throughput of the communication). So as to mitigate the decrease in goodput, the FEC may be encoded with a higher rate via puncturing. As shown in FIG. 5C, the input data can be fed through a convolution coder so as to achieve a 1/2 code rate. The 1/2 code rate can further be fed through a puncturing matrix to achieve other code rates, such as R=2/3 or R=3/4 as shown. In some embodiments, FEC can be applied with a puncturing rate of 5/6. Puncturing omits some of the encoded bits in the transmitter—thus reducing the number of transmitted bits and increasing the coding rate). A dummy "zero" metric is inserted into the convolution decoder on the receiver side in place of the omitted bits.

Therefore, introducing FEC into a protocol including ARQ and artificial noise improves performance in poor signal conditions, e.g. in harsh environments such as those subject to jamming or interference. However, as recognized by the present embodiments, the artificial noise needs to be controllably introduced at an appropriate position within the message generation such that the FEC and artificial noise cannot intermix.

Accordingly, in the above protocols, the FEC vector and AN vector are chosen such that application of the FEC code does not inadvertently correct apparent erroneous bits in the data arising from the artificial noise bits, as these have been added intentionally and are to be canceled by combination with the subsequent data packet. That is, the artificial noise vector is designed to be external to the error-correcting capabilities of the code and the FEC code is chosen to correct an expected subset of all errors that may occur other than those arising from the artificial noise.

The present embodiments recognize that, in order to controllably introduce the artificial noise in a synergetic way with the FEC bits, the artificial noise should be added as digital bits prior to modulation, e.g. as shown in FIGS. 3A-3B.

For example, as shown in FIG. 3A, the FEC coder (303) is applied prior to the additional of the artificial noise (305). As will be appreciated, the artificial noise will need to be designed so as to not affect or mix with the functionality of the FEC coder. For instance, the FEC coder may be applied with a puncturing operation, however at least some of the omitted encoded bits resulting from the puncturing operation may instead be replaced with artificial noise bits. In contrast, FIG. 3B shows the FEC coder (303) being applied after the addition of the artificial noise (305). Accordingly, the FEC coder acts on the entire packet including the message vector and the artificial noise as if the entire packet were the intended payload.

Figure 6A:
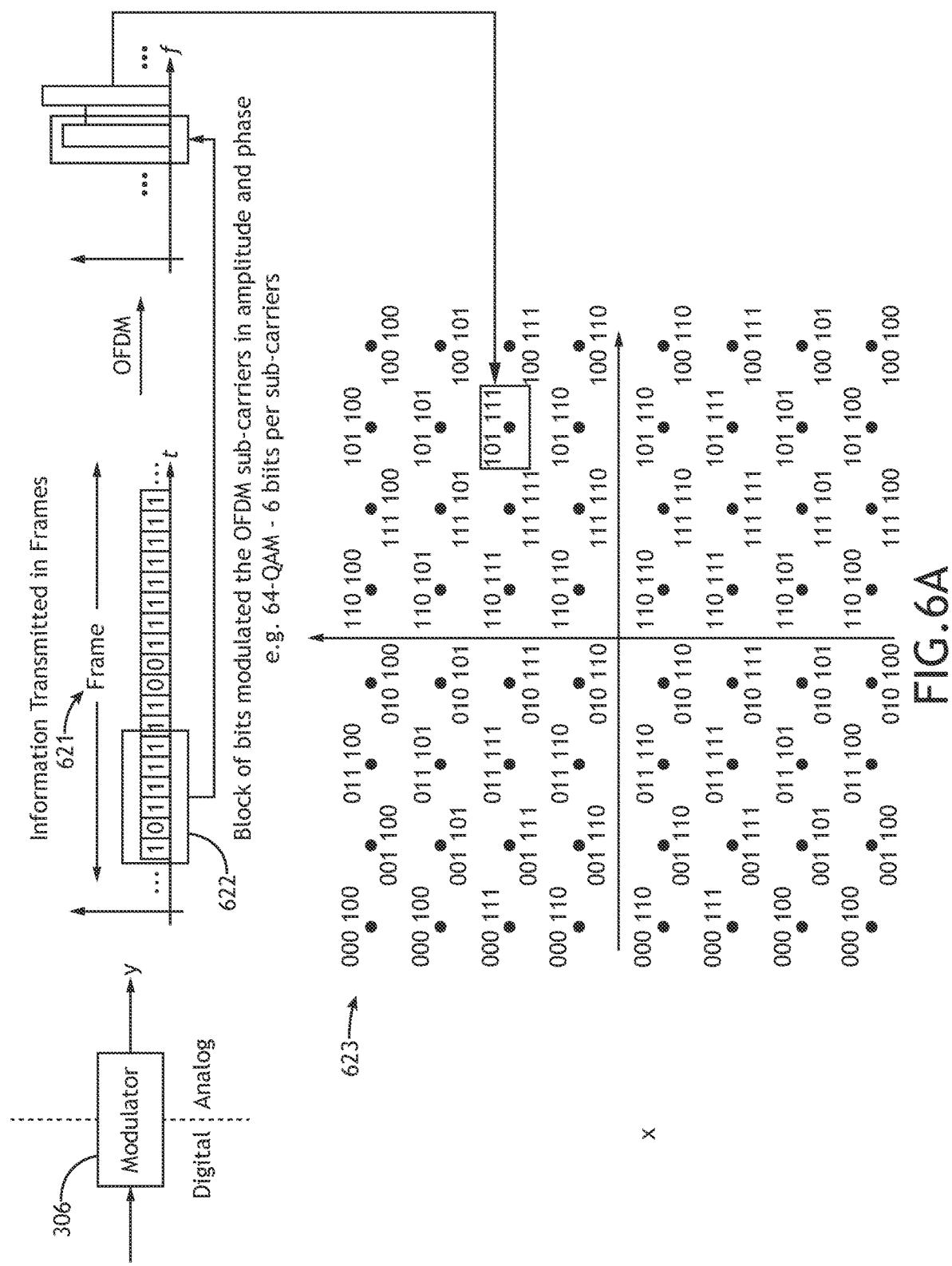
FIG. 6A is a schematic of the digital to analogue conversion process applied by a modulator.

Referring to FIG. 6A, there is shown a schematic of the digital to analogue conversion process applied by modulator 306 in FIGS. 3A-3B without artificial noise being added to the data packet. As will be appreciated, the information is to be transmitted in frames (621). For example, several blocks (622) of bits may be modulated or encoded on to multiple carrier frequencies, e.g. via orthogonal frequency-division multiplexing (OFDM). The block of bits may each be represented via a specific combination in amplitude and phase, e.g. as shown in the 64-QAM (6 bits per sub-carrier) constellation diagram (623).

Figure 6B:
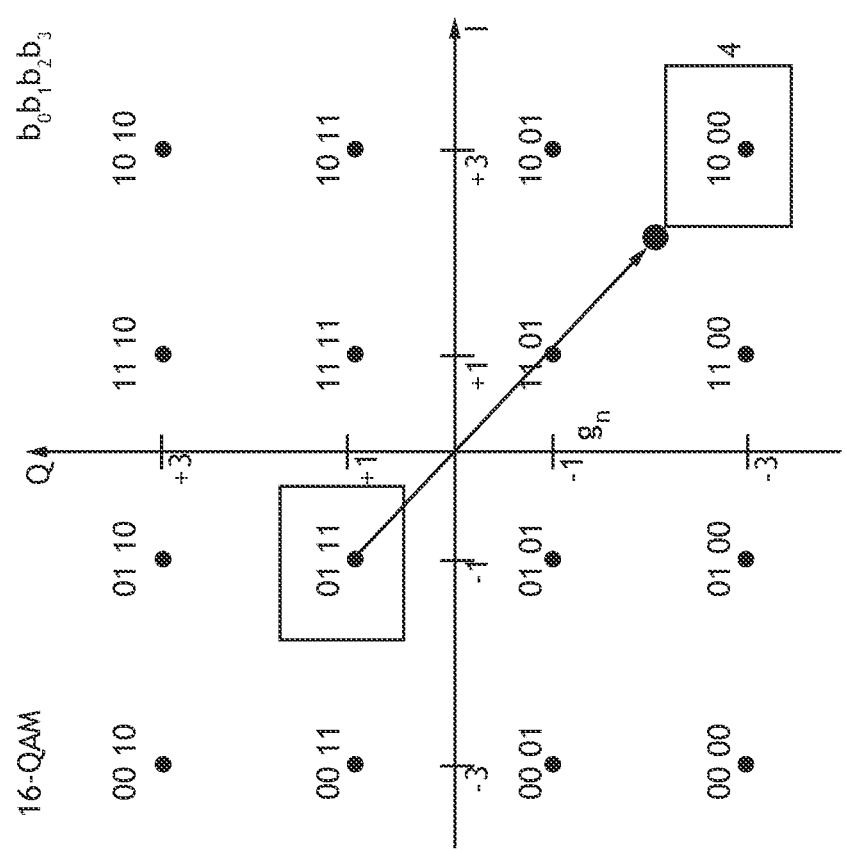
FIG. 6B is a schematic representation of digital artificial noise creation.

Referring to FIG. 6B, there is shown a schematic representation of digital artificial noise creation. For example, consider a set of $N_{bpc}$ bits per carrier, e.g. $N_{bpc}=4$ bits per carrier which corresponds to 16-QAM (quadrature amplitude modulation). Noise is to be added to a particular constellation symbol, e.g. symbol 0111. A random artificial noise sample may be generated via $$g_n = \frac{\sqrt{\frac{\varphi}{2}}}{|h|^2}[(2u_n - 1) + j(2q_n - 1)], \qquad (10)$$

wherein n=1, ..., N is the number of symbol per frame, φ is phase noise, j is the imaginary unit, and u and q vectors may be chosen to be Bernoulli-distributed random variables with values of ones and zeroes. It will be understood that the artificial noise sample may generated any number of ways, and need not be random. The noise generated by Equation (10) is added to the constellation symbol 0111. The constellation symbol closest to the point $y_n=x_n+g_n \rightarrow y_n$ is selected, such as constellation symbol 1000 (wherein the determination of the closest symbol may be done via calculating the Euclidian distance $L^2$ norm. The difference (binary values) between $y_n$ and $x_n$, is calculated, e.g., $d_n=x_n-y_n$. In the example of FIG. 6B this is therefore 1000–0111=0001. This difference $d_n$ is the digital noise to be added to the initial set of bits. For example, as shown in FIG. 6B, this would be 0111+0001=1000. The above described process is then iterated on N (number of sub-carriers, i.e. symbols per frame) such that g=[$g_1g_2 \ldots g_N$] represents a vector of N complex numbers.

It will be appreciated that the above process need not be iterated on every integer within the series n=1, ..., N—but rather may be iterated on a pre-defined subset of integers.

Figure 6C:
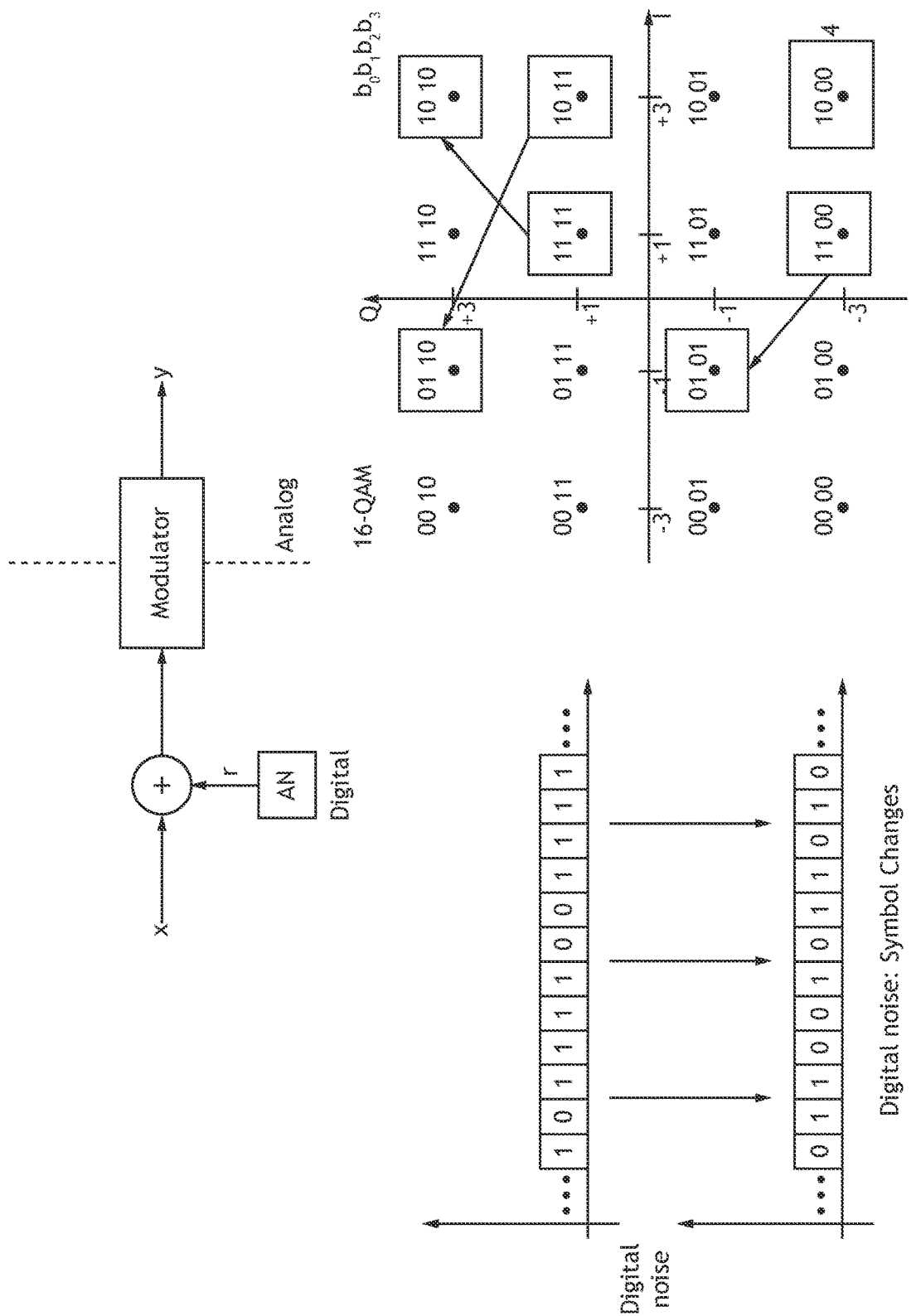
FIG. 6C is a schematic of the process of adding artificial noise at the symbol level on a symbol-by-symbol basis within a single frame.

Referring to FIG. 6C, there is shown schematically the process of adding artificial noise at the symbol level on a symbol-by-symbol basis within a single frame. Although the impact in the transmitted symbols is limited by symbol-to-symbol changes (as opposed to adding artificial noise within the analogue domain, wherein there is a higher degree of freedom in shifting the modulated symbol, e.g. to a point not landing on a particular constellation symbol), it will be appreciated that adding artificial noise at the "bit level" enables the addition of noise anywhere within the communication chain prior to the modulator and enables the addition of artificial noise in such a way as to remain unaffected by the application of an FEC encoder. As will be appreciated, the flexibility in deciding when to introduce artificial noise within the above protocol may be advantageous.

Figure 7:
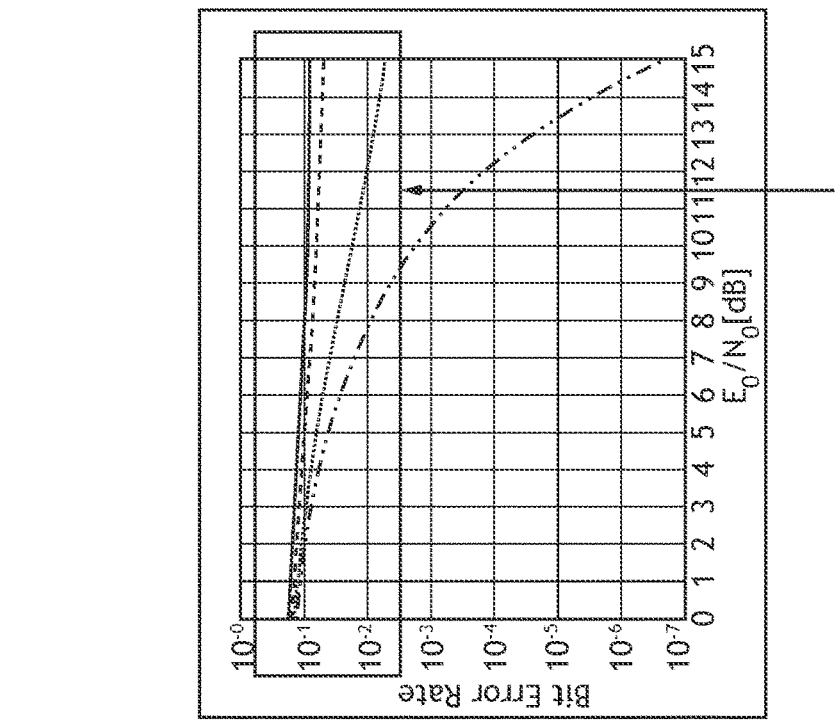
FIG. 7 shows numerical results of the secrecy performance of the protocol of one of the embodiments.
Figure 7:
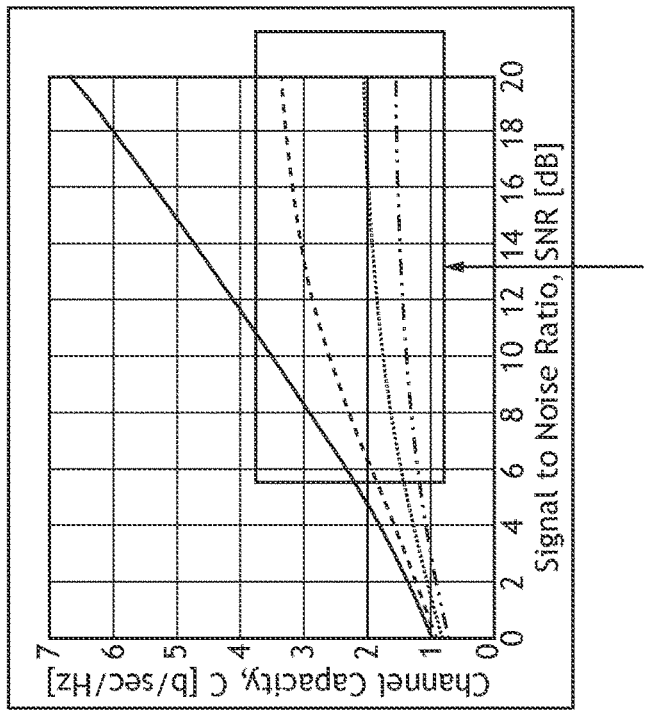

Moreover, introducing artificial noise bits digitally as shown in FIG. 6C advantageously enables several degrees of freedom over the design of the artificial noise, for example via: modification of the artificial noise probability distribution function; artificial noise power adjustment; baseband peak-to-average power ration control; and/or phase noise. For example, the artificial noise may be designed via controlling the phase noise, such as uniform phase distribution with a constant envelope. FIG. 7 shows numerical results of the secrecy performance of the protocol of one of the embodiments. As shown, the left-hand panel shows the reduced channel capacity for the eavesdropper as compared to the legitimate receive. As shown in the right-hand panel, the eavesdropper cannot decode the information even if the quality of the signal is good, as the eavesdropper experiences substantial performance degradation even for small amounts of artificial noise.

The above protocols may further be adapted to incorporate incremental redundancy. That is, every re-transmission contains different information than the previous one. Multiple sets of coded bits are generated, each representing the same set of information bits. The re-transmission typically uses a different set of coded bits than the previous transmission, with different redundancy versions generated by puncturing the encoder output. Thus, at every re-transmission the receiver gains extra information. The artificial noise bits for each re-transmission is designed such that the noise cancellation step is unaffected by the puncturing.

Figure 8A:
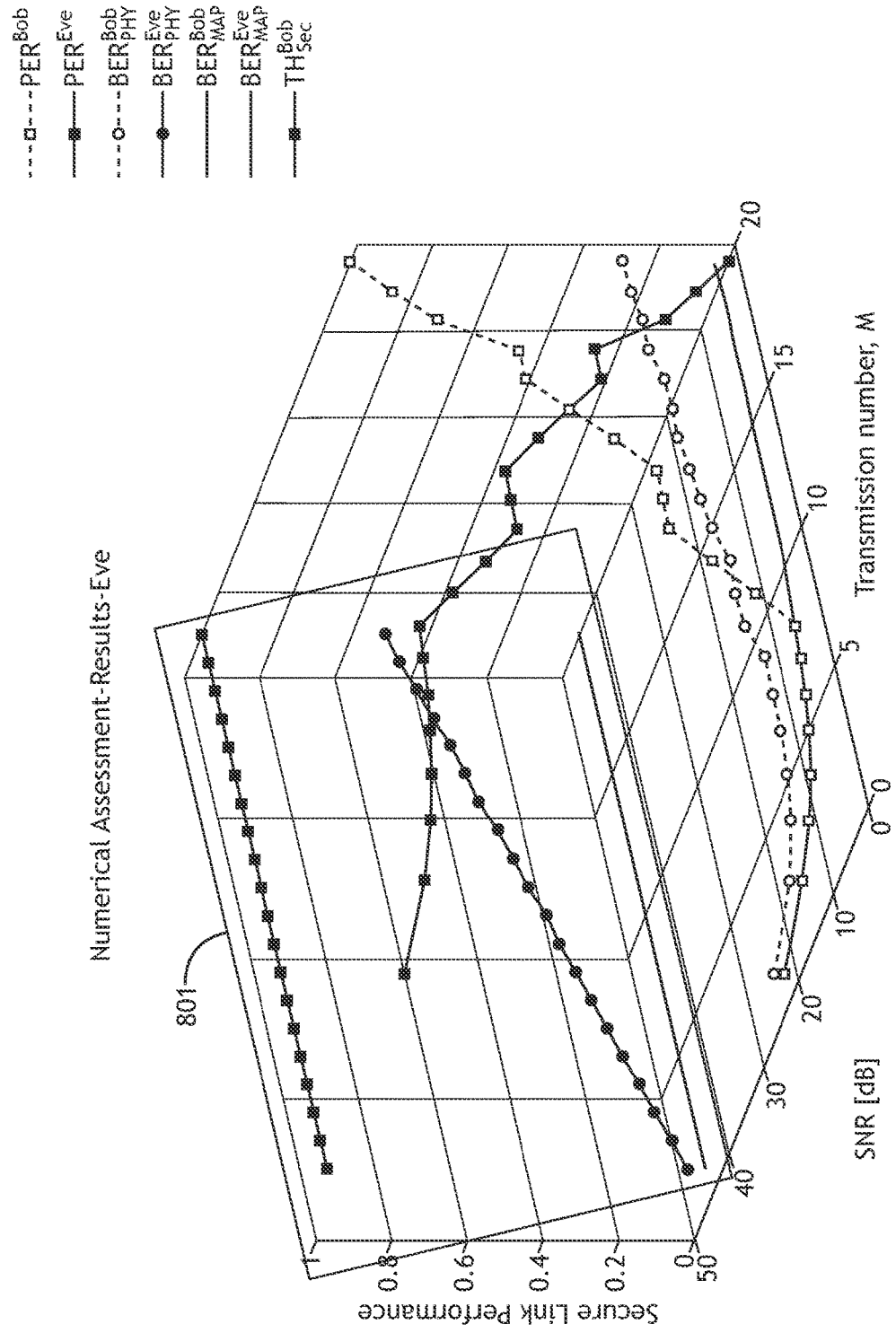
FIGS. 8A and 8B show numerical results of the secrecy performance of the protocol of one of the embodiments as a function of number of transmissions.
Figure 8B:
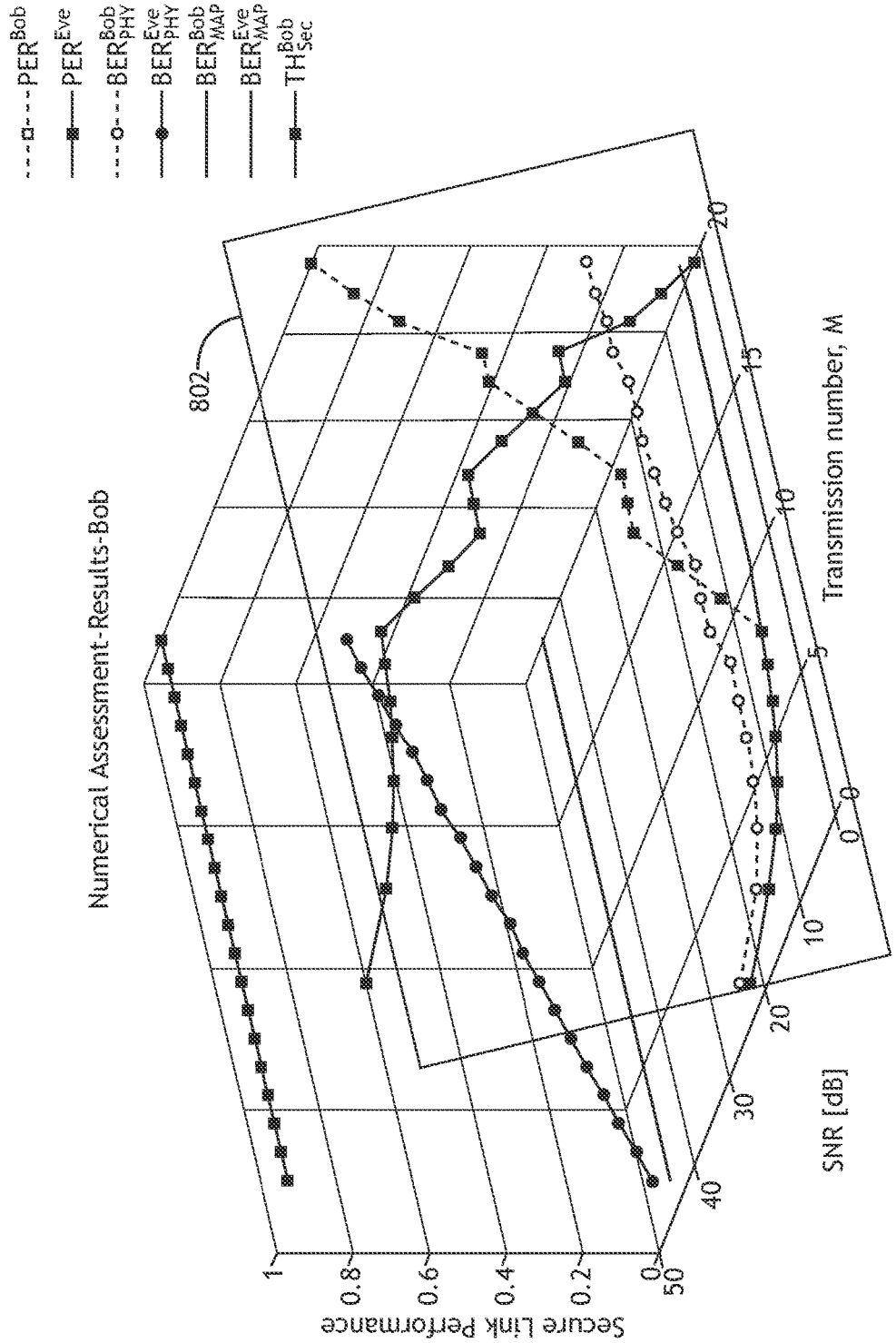

Turning now to FIGS. 8A and 8B, there are shown numerical results as a function of increasing number of retransmissions for the legitimate receiver (Bob) and the eavesdropper (Eve). The results have the following parameters. For frame transmission: frame size is S=120 [bit]; modulation is BPSK (1 bit per symbol); and 10 packets are transmitted. For Eve's channel: SNR=45 [dB]. For Bob's channel: SNR_m=45 [dB]/M, with the number of retransmission M=2, ..., 20. Number of noisy bits is: AN=3+6·m; where m=1, ..., /2—different when number of retransmissions has been set. Eve's has an "almost perfect" channel—high SNR, however the ratio: |h_e|^2/|h_b|^2 has been selected to avoid Eve to decode the artificial noise. On Bob's side, he knows how to remove the artificial noise but some bits maybe corrupted because the low SNR.

FIGS. 8A and 8B use the following definitions. $BER_{MAP}^{Bob}$ is the Bob's Bit Error Rate, it is the ratio between the number of bits correctly decoded by the Bob's MAP and the total number of transmitted bits. $BER_{MAP}^{Eve}$ is the Eve's Bit Error Rate, it is the ratio between the number of bits correctly decoded by the Eve's MAP and the total number of transmitted bits. $BER_{PHY}^{Bob}$ is the Bob's Bit Error Rate at PHY layer, it is the ratio between the number of bits correctly decoded by Bob after the noise removal and the total number of transmitted bits. $BER_{PHY}^{Eve}$ is the Eve's Bit Error Rate at PHY layer, it is the ratio between the number of bits correctly decoded by Eve after the noise removal and total number of transmitted bits. $PER^{Bob}$ is the Bob's Packet Error Rate, it is the ratio between the number of packets correctly decoded by Bob after the noise removal and the total number of transmitted packets. $PER^{Eve}$ is the Eve's Packet Error Rate, it is the ratio between the number of packets correctly decoded by Eve after the noise removal and the total number of transmitted packets. $TH_{sec}^{Bob}=TH^{Bob}-TH^{Eve}$, it is the secure Bob's throughput, defined as the difference between the Bob's and Eve's throughput at MAC layer. The throughput is the (normalized) quantity of correct packets transmitted per unit of time.

FIG. 8A shows the numerical results for Eve, and represents PER, BER or Secure throughput (normalized). As shown in frame 801, $BER_{MAP}^{Eve}$ is equal to zero because, Eve is able to decode perfectly all the incoming information (high SNR). $BER_{PHY}^{Eve}$ is equal to $$\frac{S - AN_b}{S}$$

because she can decode correctly only the bits not corrupted by the artificial noise. $PER^{Eve}$ is equal to one because there is at least a not correctly decoded bit in the packet (i.e. the noisy bits).

FIG. 8B shows the numerical results for Bob, and represents $TH_{sec}^{Bob}$, $PER^{Bob}$, $BER_{PHY}^{Bob}$, and $BER_{MAP}^{Bob}$. As shown in frame 802, $BER_{MAP}^{Bob}$ depends by the SNR value, so for decreasing values of SNR, the BER increases. However, BPSK is a robust modulation so for SNR ~2 [dB] the BER is in the order of 3 [%]. The same behavior applies for $BER_{PHY}^{Bob}$ but the value is higher because it is computed over $S-AN_b$ bits instead of S bits. $PER^{Bob}$ is equal to 0 (perfect decoding after M retransmission) for SNR>4.5 [dB]. After that, the impact of the channel leads to an increase of $PER^{Bob}$, till for SNR=2.14 [dB] all the 10 packets have not been decoded properly. However, $PER^{Bob} \geq PER^{Eve}$. $TH_{sec}^{Bob}$ is equal to $TH^{Bob}$ because $TH^{Eve}$ is always equal to zero, since $PER^{Eve}=1$ no information is decoded by Eve. $TH_{sec}^{Bob}$ is equal to 1 for SNR >4.5 [dB]. After that it starts decreasing because some of the packets have not been decoded properly after the retransmisisons.

The above security protocols will function on existing communication hardware which implement HARQ-I and HARQ-II in present communications systems, such as HSDPA and/or LTE, without requiring modification of the hardware. Any suitable and desired communication system may be used.

Moreover, the above protocols are applicable to regular single-input-single-output (SISO) systems, e.g. single carrier frequency division multiplex (SC-FDMA), as well as to orthogonal frequency division multiplexing (OFDM) or multiple-input-multiple-output (MIMO) OFDM.

The methods in accordance with the technology described herein may be implemented at least partially using software e.g. computer programs. Thus, the methods are generally computer-implemented methods. It will thus be seen that when viewed from further embodiments the technology described herein comprises computer software specifically adapted to carry out the methods herein described when executed by an appropriate processing circuit at the sender/receiver device. The processing circuit may be a microprocessor system, a programmable FPGA (field programmable gate array), etc.

However, in general, the various functions of the technology described herein can be carried out in any desired and suitable manner. For example, the functions of the technology described herein can be implemented in hardware or software, as desired. Thus, for example, unless otherwise indicated, the various functional elements, stages, units, and "means" of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

Thus, the sender device may comprise a suitable data packet generating circuit that is operable to generate the data packets, as well as a suitable data packet encoding circuit that is operable to add the desired error check and/or FEC bits, depending on the mode of operation. The sender device also comprises an appropriate artificial noise introducing circuit that is able to operate in the manner described above. These circuits may be separate or may be part of the same overall processing circuit, as desired.

Although the present embodiments has been described with reference to preferred embodiments, it will be understood by those skilled in the art that various changes in form and detail may be made without departing from the scope of the embodiments as set forth in the accompanying claims.

The invention claimed is:

1. A method of transmitting a message from a sender to a receiver, wherein a communication between the sender and the receiver is performed using a hybrid automatic-repeat-request (HARQ) protocol in which a first data packet transmitted from a sender device of the sender to a receiver device of the receiver comprises a first part representing the message transmitted and a second part representing an error detection code used by the receiver to perform an error check on the first part of the first data packet, and in which, upon the error check failing, the sender device is triggered to transmit to the receiver device a second data packet comprising a corresponding first part representing the message transmitted and a corresponding second part representing a first forward error correction code, the method comprising:

(i) when the message is transmitted from the sender to the receiver:
    generating at the sender device the first data packet, the first data packet including the first part representing the message transmitted and the second part representing the error detection code for performing the error check on the first part of the first data packet; and
    digitally introducing at the sender device a first artificial noise component to the first data packet by modifying a first set of bits in the first data packet, wherein the first artificial noise component present within the first set of bits of the first data packet causes the error check to fail and automatically triggers the sender device to transmit the second data packet;

(ii) the sender device transmitting the first data packet including the first artificial noise component introduced to the receiver device over a sender-receiver communications channel;

(iii) receiving the first data packet including the first artificial noise component at the receiver device, the receiver device performing the error check on the first data packet;

(iv) in response to determining that the error check has failed, the sender device generating the second data packet, the second data packet including the corresponding first part representing the message transmitted and the corresponding second part representing the first forward error correction code, wherein the generating the second data packet further comprises the sender device digitally introducing a second artificial noise component to the second data packet by modifying a second set of bits in the second data packet, wherein the second artificial noise component is configured to process the first data packet and the second data packet together to remove the first artificial noise component and the second artificial noise component to extract the message;

(v) the sender device transmitting the second data packet including the second artificial noise component to the receiver device over the sender-receiver communications channel; and (vi) receiving the second data packet including the second artificial noise component at the receiver device and processing the first data packet and the second data packet together to extract the message.

2. The method of claim 1, wherein in response to the receiver determining that the error check fails, the receiver transmits a negative acknowledgement signal to the sender, the negative acknowledgement signal triggering the sender device to transmit the second data packet.

3. The method of claim 1, wherein the HARQ protocol is a type-I HARQ protocol such that, in step (i), the first data packet includes a third part representing a second forward error correction code.

4. The method of claim 3, wherein the digitally introducing the first artificial noise component to the first data packet by modifying the first set of bits in the first data packet comprises:
  modifying the first set of bits of the first part of the first data packet representing the message transmitted prior to adding the third part of the first data packet representing the second forward error correction code.

5. The method of claim 1, wherein the HARQ protocol is a type-II HARQ protocol.

6. The method of claim 5, wherein the digitally introducing the second artificial noise component to the second data packet by modifying the second set of bits in the second data packet comprises:
  modifying the second set of bits of the corresponding first part of the second data packet representing the message transmitted prior to adding the corresponding second part of the second data packet representing the first forward error correction code.

7. The method of claim 1, wherein the first artificial noise component and the second artificial noise component are given by $r_1 = g/|h_{b1}|^2$ and $r_2 = g/|h_{b2}|^2$, respectively, wherein g is a global artificial noise key, and wherein $|h_{b1}|^2$ and $|h_{b2}|^2$ are transfer functions of a legitimate transmitter-receiver channel at a time of transmitting of the first data packet and the second data packet, respectively.

8. The method of claim 1, wherein the first data packet is digitally stored, and wherein the first data packet and the second data packet are processed together using one or more of: (a) maximal ratio combining, (b) selection combining, or (c) equal gain combining.

9. The method of claim 1, comprising:
  sending greater than two data packets, wherein a respective artificial noise component is digitally introduced to each of the greater than two data packets, whereby the respective artificial noise component is generated such that when the greater than two data packets are processed together at the receiver the respective artificial noise component is removed.

10. The method of claim 1, wherein:
  (i) the sender is an aircraft and the receiver is a ground receiver; or
  (ii) the sender is a ground sender and the receiver is the aircraft.

11. A method of transmitting a message from a sender to a receiver, performed at a sender device of the sender, wherein a communication between the sender and the receiver is performed using a hybrid automatic-repeat-request (HARQ) protocol in which a first data packet transmitted from the sender device to a receiver device of the receiver comprises a first part representing the message transmitted and a second part representing an error detection code used by the receiver to perform an error check on the first part of the first data packet, and in which upon the error check failing, the sender device is triggered to transmit to the receiver a second data packet comprising a corresponding first part representing the message transmitted and a corresponding second part representing a first forward error correction code, the method comprising:
  (i) when the message is transmitted from the sender to the receiver:
    generating the first data packet, the first data packet including the first part representing the message transmitted and the second part representing the error detection code for performing the error check on the first part of the first data packet; and
    digitally introducing a first artificial noise component to the first data packet by modifying a first set of bits in the first data packet, wherein the first artificial noise component present within the first set of bits in the first data packet causes the error check to fail and automatically triggers the sender to transmit the second data packet;
  (ii) transmitting the first data packet including the first artificial noise component introduced to the receiver device over a sender-receiver communications channel;
  (iii) in response to the sender device determining that the error check has failed, the sender device generating the second data packet, the second data packet including the corresponding first part representing the message transmitted and the corresponding second part representing the first forward error correction code, wherein the generating the second data packet further comprises digitally introducing a second artificial noise component to the second data packet by modifying a second set of bits in the second data packet, wherein the second artificial noise component is configured to remove at the receiver the first artificial noise component introduced to the first data packet; and
  (iv) transmitting the second data packet including the second artificial noise component to the receiver over the sender-receiver communications channel.

12. The method of claim 11, wherein:
  (i) the sender is an aircraft and the receiver is a ground receiver; or
  (ii) the sender is a ground sender and the receiver is the aircraft.

13. The method of claim 11, wherein in response to the receiver determining that the error check fails, the receiver transmits a negative acknowledgement signal to the sender, the negative acknowledgement signal triggering the sender device to transmit the second data packet.

14. The method of claim 11, wherein the HARQ protocol is a type-I HARQ protocol such that, in step (i), the first data packet includes a third part representing a second forward error correction code.

15. The method of claim 14, wherein the digitally introducing the first artificial noise component to the first data packet by modifying the first set of bits in the first data packet comprises:
  modifying the first set of bits of the first part of the first data packet representing the message transmitted prior to adding the third part of the first data packet representing the second forward error correction code.

16. The method of claim 11, wherein the HARQ protocol is a type-II HARQ protocol.

17. The method of claim 14, wherein the digitally introducing the second artificial noise component to the second data packet by modifying the second set of bits in the second data packet comprises:
  modifying the second set of bits of the corresponding first part of the second data packet representing the message transmitted prior to adding the corresponding second part of the second data packet representing the first forward error correction code.

18. The method of claim 11, wherein the first artificial noise component and the second artificial noise component are given by $r_1 = g/|h_{b1}|^2$ and $r_2 = g/|h_{b2}|^2$, respectively, wherein g is a global artificial noise key, and wherein $|h_{b1}|^2$ and $|h_{b2}|^2$ are transfer functions of a legitimate transmitter-receiver channel at a time of transmitting of the first data packet and the second data packet, respectively.

19. The method of claim 11, wherein the first data packet is digitally stored, and wherein the first data packet and the second data packet are processed together using one or more of: (a) maximal ratio combining, (b) selection combining, or (c) equal gain combining.

20. The method of claim 11, comprising:
sending greater than two data packets, wherein a respective artificial noise component is digitally introduced to each of the greater than two data packets, whereby each respective artificial noise component is generated such that when the greater than two data packets are processed together at the receiver the respective artificial noise component is removed.

* * * * *